United States Patent [19]
Nakamura et al.

[11] Patent Number: 5,740,168
[45] Date of Patent: Apr. 14, 1998

[54] METHOD AND APPARATUS FOR SWITCHING RADIO LINKS IN MOBILE COMMUNICATION

[75] Inventors: Takehiro Nakamura; Narumi Umeda; Akira Hiroike, all of Yokosukashi, Japan

[73] Assignee: NTT Mobile Communication Network Inc., Tokyo, Japan

[21] Appl. No.: 448,342

[22] PCT Filed: Oct. 13, 1994

[86] PCT No.: PCT/JP94/01708

§ 371 Date: Jun. 12, 1995

§ 102(e) Date: Jun. 12, 1995

[87] PCT Pub. No.: WO95/10920

PCT Pub. Date: Apr. 20, 1995

[30] Foreign Application Priority Data

| Oct. 13, 1993 | [JP] | Japan | 5-255808 |
| May 26, 1994 | [JP] | Japan | 6-112734 |
| May 26, 1994 | [JP] | Japan | 6-112739 |
| Jul. 11, 1994 | [JP] | Japan | 6-158846 |
| Jul. 11, 1994 | [JP] | Japan | 6-158852 |

[51] Int. Cl.$^6$ ................................ H04J 3/16
[52] U.S. Cl. ............................ 370/347; 370/350
[58] Field of Search .................. 370/329, 331, 370/332, 335, 342, 350, 508, 509, 510, 512, 330, 334, 347; 455/33.1, 332, 34.1, 51.1, 54.1, 56.1, 58.1, 58.2; 379/59, 60

[56] References Cited

U.S. PATENT DOCUMENTS 5,535,425  7/1996  Watanabe ................ 455/33.2
5,561,852  10/1996  Heeschen et al. ........ 455/54.1
5,574,974  11/1996  Almgren et al. ......... 455/33.1

FOREIGN PATENT DOCUMENTS 63-245025  10/1988  Japan.
389636  4/1991  Japan.

*Primary Examiner*—Douglas W. Olms
*Assistant Examiner*—Ajit Patel
*Attorney, Agent, or Firm*—Oblon, Spivak, McClelland, Maier & Neustadt, P.C.

[57] ABSTRACT

A radio link switching scheme in which a communication between the base station and the mobile station is carried out through the radio link given in terms of frames while providing a switching timing information formed by a layer 1 bit data in each frame of the radio link such as a unique word, a flag, a housekeeping bit, and a frame number. Then, the switching timing information in at least one of the frames of the radio link at the base station is changed to indicate a switching of the radio link whenever a need for switching the radio link between the base station and the mobile station arises, and transmitted to the mobile station. At the base station, the radio link is switched at a switching timing which is a prescribed period of time after each frame in which the switching timing information is changed, while at the mobile station the radio link is switched at a switching timing which is a predetermined period of time after each frame in which the changed switching timing information is detected.

54 Claims, 15 Drawing Sheets

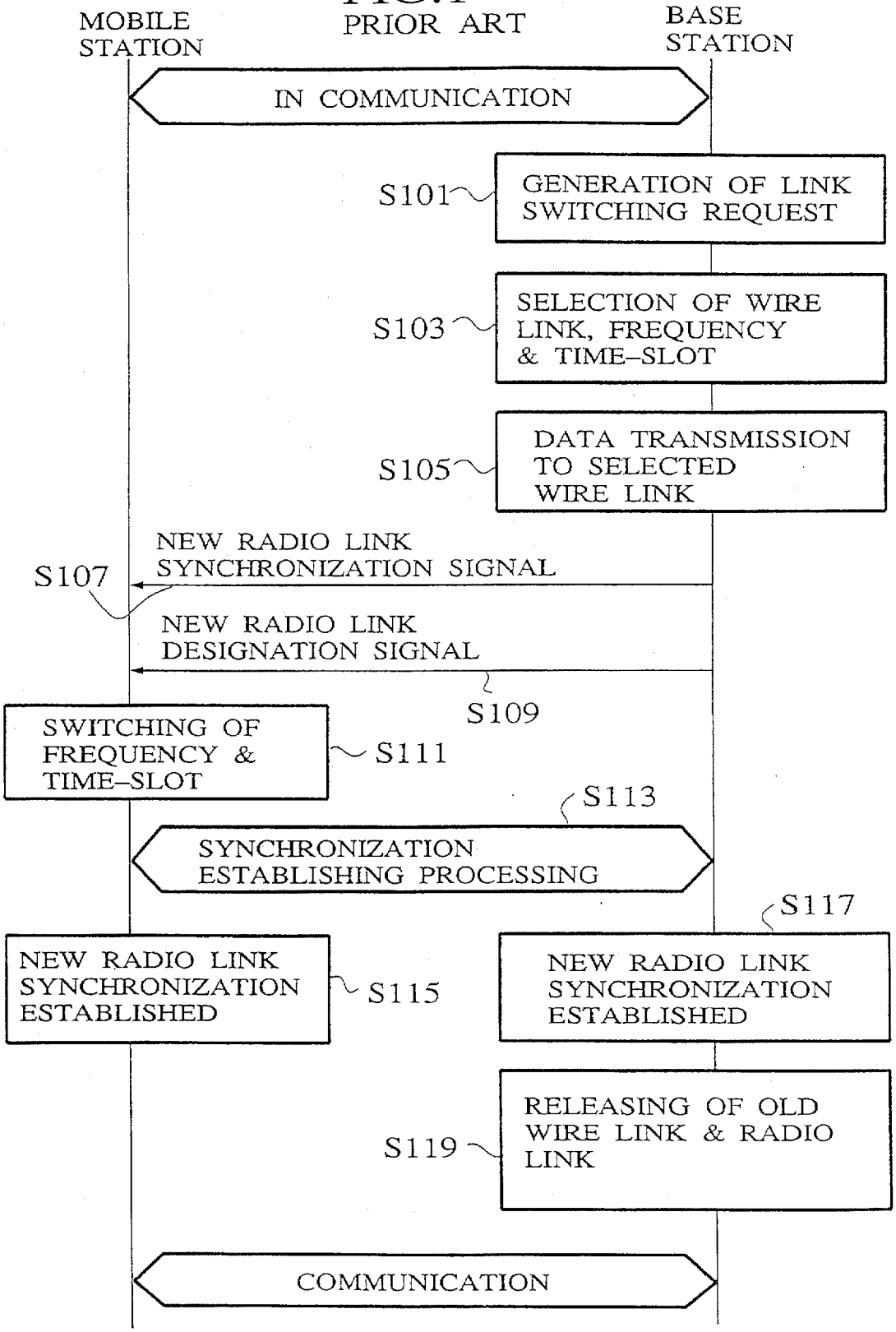

FIG.21

| SIR VALUE | SWITCHING TIMING NOTICE FRAME NUMBER |
|---|---|
| OVER 5dB | 1 |
| 4dB ~ 5dB | 2 |
| 3dB ~ 4dB | 3 |
| 2dB ~ 3dB | 4 |
| 1dB ~ 2dB | 5 |
| 0dB ~ 1dB | 6 |
| BELOW 0dB | 7 |

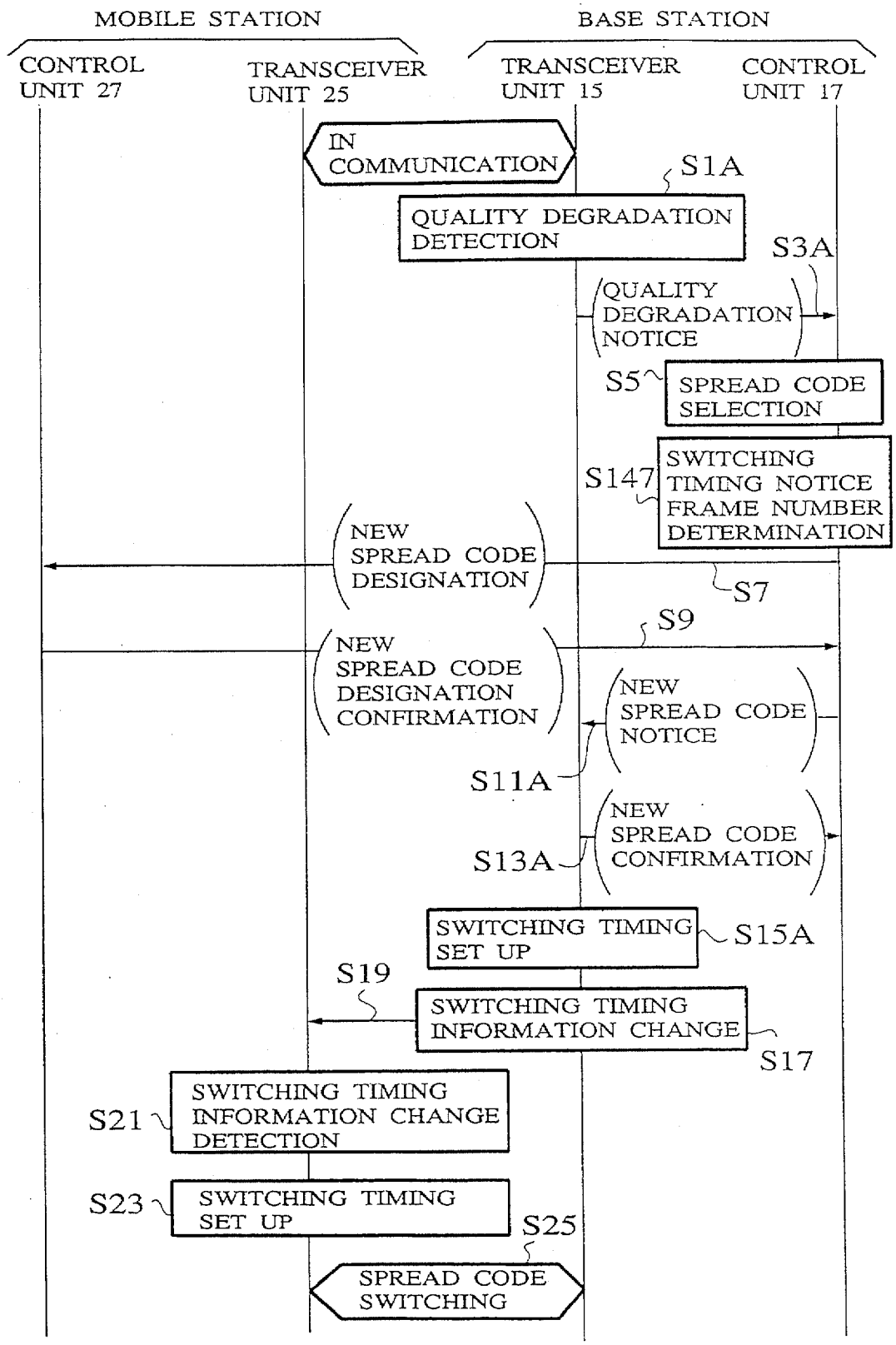

METHOD AND APPARATUS FOR SWITCHING RADIO LINKS IN MOBILE COMMUNICATION

TECHNICAL FIELD

The present invention relates to a radio link switching scheme suitable for an intra-base station radio link switching.

BACKGROUND ART

In recent years, the mobile communication for carrying out communications by utilizing radio links between base stations and mobile stations has come to be widely used. The service area of such a mobile communication is formed by a multiplicity of cells (or zones), where a base station is provided in each cell. Thus, usually, the mobile station which moves within a certain cell is going to carry out the communication through a prescribed radio link with the base station provided in that certain cell. Here, the radio link used is not necessarily fixed to a particular one, and will be switched as the need arises.

There are two types of the radio link switching required in the mobile communication, including the inter-base station radio link switching and an intra-base station radio link switching. The inter-base station radio link switching is executed in a case of changing the base station in communication with the mobile station, as the mobile station moves from a cell of the currently communicating base station to a neighboring cell of another base station. On the other hand, the intra-base station radio link switching is executed in a case the degradation of the radio link quality is caused by the interference from the other base station or mobile station. A conventional scheme for this intra-base station radio link switching will now be described.

In the digital mobile telephone system currently in practical use, the intra-base station radio link switching within one and the same base station is handled by the identical scheme as in the inter-base station radio link switching, which proceeds according to the sequence chart shown in FIG. 1 as follows.

Namely, while the base station and the mobile station are in communication by using the transceiver circuit of the base station, when this transceiver circuit detects the degradation of the quality of the radio link in use, this fact is notified to a control circuit of the base station in a form of a link switching request (step S101). In response, the control circuit makes the selection of unused wire link, frequency, and time-slot (step S103), and notifies the selected wire link to an exchanger station. Then, the exchange station makes the signal transmission with respect to the notified wire link in addition to the wire link currently in use (step S105) while the control circuit notifies the selected frequency and the time-slot to the transceiver circuit connected with the selected wire link.

The transceiver circuit which received this notice then generates the new radio link synchronization signal according to the notified frequency and the time-slot, and transmits the generated new radio link synchronization signal to the mobile station (step S107). In addition, the control circuit transmits the new radio link designation signal to the mobile station via the old radio link so as to notify the frequency and the time-slot of the new radio link (step S109).

Then, the control circuit of the mobile station notifies the notified new frequency and time-slot to the transceiver circuit of the mobile station such that this transceiver circuit switches the frequency and time-slot to the notified new frequency and time-slot (step S111). Then, this transceiver circuit receives the new radio link synchronization signal transmitted from the transceiver circuit of the base station to carry out the synchronization establishing processing for the new radio link (step S113), so as to establish the new radio link synchronization on the mobile station side and the base station side (steps S115 and S117).

When this synchronization is established, the base station stops the signal transmission to the old wire link, and releases the old wire link and radio link (step S119). Then, the communication through the newly set up radio link is started.

Now, in contrast to the intra-base station radio link switching in the TDMA-FDMA system in which it suffices to change only the radio section parameters given by the frequency and the time-slot, the above described conventional intra-base station radio link switching in the mobile communication system uses two transceiver circuits on the mobile station side and the base station side, so that it also becomes necessary to change the wire link connected with the transceiver circuit of the base station side, and for this reason the switching processing is considerably more complicated.

In order to eliminate the necessity for changing the wire link, it is necessary to switch the radio section parameters within one and the same transceiver circuit. Here, in a case of switching the radio section parameters within one and the same transceiver circuit, if the switching timings are different at the base station side and the mobile station side, there is a high probability for the breaking of the communication over a considerable period of time to occur between the completion of the switching on one side and the completion of the switching on the other side. For this reason, it is preferable to carry out the radio link switching at the same timing on both the base station side and the mobile station side. However, in the above described conventional scheme, there is no means for notifying the switching timing among the base station and the mobile station, so that it has been difficult to carry out the radio link switching at the same timing on both the base station side and the mobile station side.

Moreover, even when the use of two transceiver circuits as in the above described conventional scheme is accepted, there still remains the problem of the breaking of the communication between the base station and the mobile station over a period of time required since the switching of the frequency and time-slot at the transceiver circuit of the mobile station to the new values selected at the base station until the establishment of the synchronization for the new radio link.

DISCLOSURE OF THE INVENTION

It is therefore an object of the present invention to provide a radio link switching scheme capable of carrying out the radio link switching at the same timing on both the base station and the mobile station, eliminating the need for a processing with respect to the wire link, and preventing the breaking of the communication at a time of the radio link switching.

It is another object of the present invention to provide a radio link switching scheme capable of reducing a probability of the failure of the radio link switching, carrying out the radio link switching at appropriate timings, and causing no trouble in the frame order control at the mobile station side.

According to one aspect of the present invention there is provided a method for switching a radio link in a mobile communication between a base station and a mobile station, comprising the steps of: carrying out a communication between the base station and the mobile station through the radio link given in terms of frames while providing a switching timing information formed by a layer 1 bit data in each frame of the radio link; changing the switching timing information in at least one of the frames of the radio link at the base station to indicate a switching of the radio link whenever a need for switching the radio link between the base station and the mobile station arises; transmitting the changed switching timing information from the base station to the mobile station; switching the radio link at the base station to a new radio link at a switching timing which is a prescribed period of time after each frame in which the switching timing information is changed at the changing step; detecting the changed switching timing information transmitted from the base station at the mobile station; and switching the radio link at the mobile station to the new radio link at a switching timing which is a predetermined period of time after each frame in which the changed switching timing information is detected at the detecting step.

According to another aspect of the present invention there is provided a mobile communication system including a base station and a mobile station, comprising: means for carrying out a communication between the base station and the mobile station through the radio link given in terms of frames while providing a switching timing information formed by a layer 1 bit data in each frame of the radio link; means for changing the switching timing information in at least one of the frames of the radio link at the base station to indicate a switching of the radio link whenever a need for switching the radio link between the base station and the mobile station arises; means for transmitting the changed switching timing information from the base station to the mobile station; means for switching the radio link at the base station to a new radio link at a switching timing which is a prescribed period of time after each frame in which the switching timing information is changed by the changing means; means for detecting the changed switching timing information transmitted from the base station at the mobile station; and means for switching the radio link at the mobile station to the new radio link at a switching timing which is a predetermined period of time after each frame in which the changed switching timing information is detected by the detecting means.

Other features and advantages of the present invention will become apparent from the following description taken in conjunction with the accompanying drawings.

BRIEF DESCRIPTION OF THE DRAWINGS

FIG. 1 is a sequence chart for a conventional intra-base station radio link switching scheme.

FIG. 21 is a diagrammatic illustration of a table used in the scheme of FIG. 20.

FIG. 25 is a sequence chart for a modification of the second embodiment of a radio link switching scheme according to the present invention.

BEST MODE FOR CARRYING OUT THE INVENTION

Now, the embodiments of the radio link switching scheme in the mobile communication according to the present invention will be described.

It is to be noted first that, in the mobile communication, a plurality of mobile stations make communications with one base station, so that the multiple access scheme is adopted. Here, the multiple access scheme includes the frequency division multiple access (FDMA) scheme, the time division multiple access (TDMA) scheme, and a code division multiple access (CDMA) scheme, and each of these may be realized separately, or in combination with the others. In the present invention, it is possible to use any of these schemes as long as the radio link has a frame structure capable of containing the layer 1 bit data representing the switching timing information as will be described below. The only difference that arises due to the choice of the multiple access scheme will be the parameter for specifying the radio link, which is given by the frequency in the FDMA, the time-slot in the TDMA, and the spread code in the CDMA. In the following, the embodiments of the present invention will be described for an exemplary case of using the CDMA scheme for the sake of explanation, although the present invention is equally applicable to the FDMA scheme or the TDMA scheme.

Figure 2A:
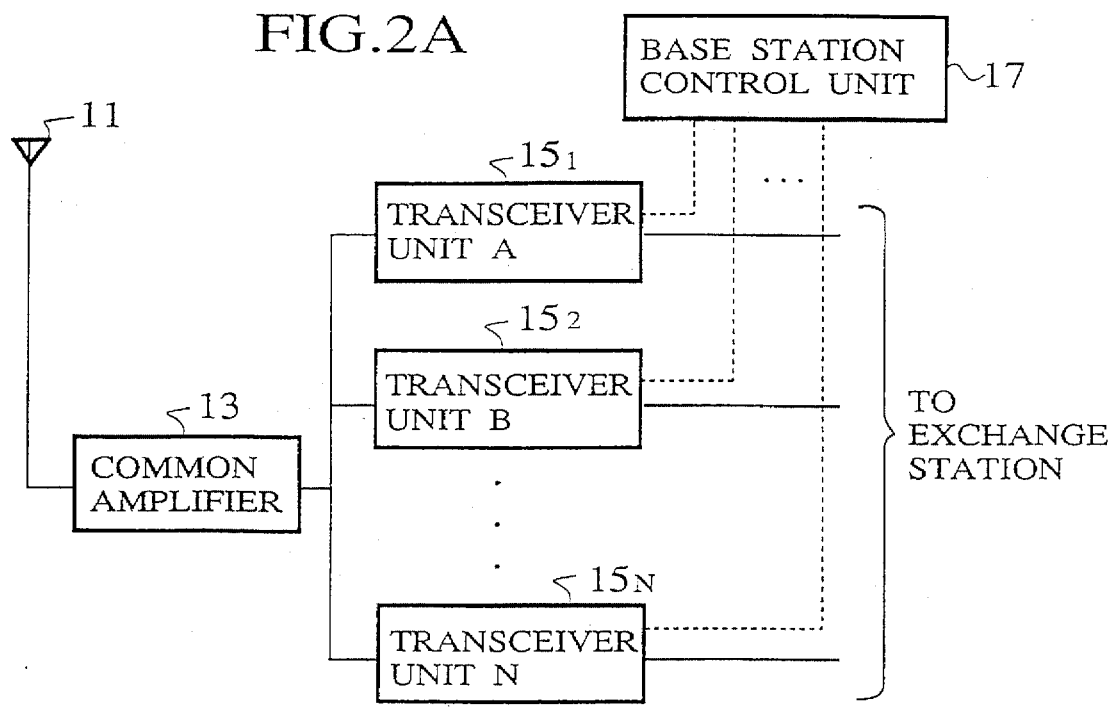
FIG. 2A is a schematic block diagram of a base station of a mobile communication system according to the present invention.
Figure 3A:
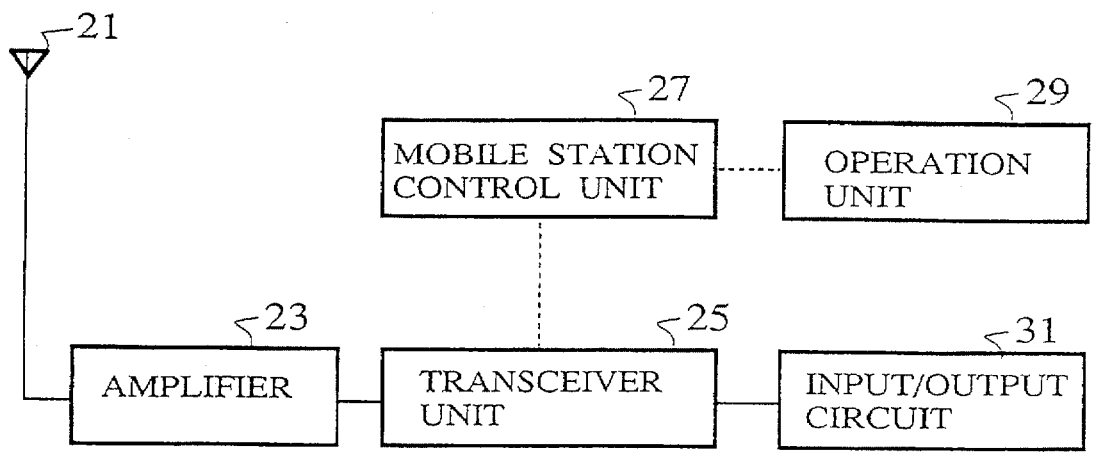
FIG. 3A is a schematic block diagram of a mobile station of a mobile communication system according to the present invention.

In this case, the base station suitable for the radio link switching scheme of the present invention has a configuration as shown in FIG. 2A, while the mobile station suitable for the radio link switching scheme of the present invention has a configuration as shown in FIG. 3A. In FIGS. 2A and 3A, the solid lines indicate communication lines while the dashed lines indicate control lines.

In the configuration of FIG. 2A, the base station comprises: an antenna 11 for transmitting and receiving radio signals to and from the mobile station; a common amplifier 13 for amplifying the transmitting signals and the receiving signals; a plurality (N pieces) of transceiver units 15 ($15_1$, $15_2$,–, $15_N$) for encoding and modulating the transmitting signals, as well as decoding and demodulating the receiving signals; and a base station control unit 17 for carrying out a control of the operation in the base station and a generation of a control signal for the mobile station.

Figure 2B:
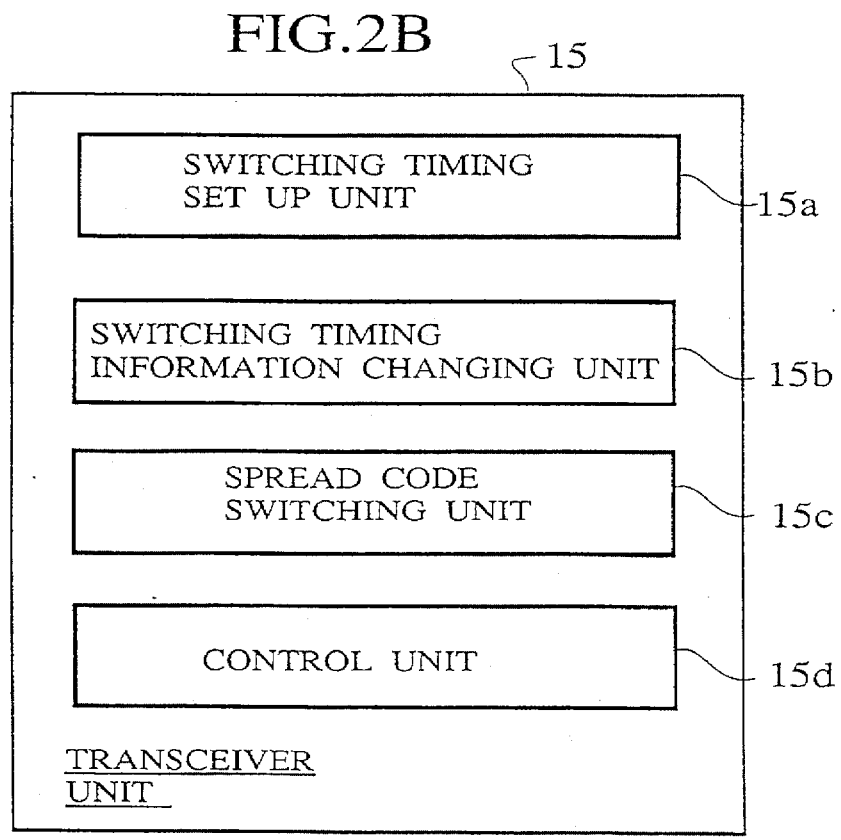
FIG. 2B is a schematic block diagram of a transceiver unit in the base station of FIG. 2A.

Here, each transceiver unit 15 corresponds to one radio link. As shown in FIG. 2B, each transceiver unit 15 includes a switching timing set up unit 15a, a switching timing information changing unit 15b, a spread code switching unit 15c, and a control unit 15d for controlling the operation in the transceiver unit 15. In addition, each transceiver unit 15 is connected with a wire link for transmitting speech or data from the user which is connected to an exchange station.

On the other hand, in the configuration of FIG. 3A, the mobile station comprises: an antenna 21 for transmitting and receiving radio signals to and from the base station; an amplifier 23 for amplifying the transmitting signals and the receiving signals; a transceiver unit 25 for encoding and modulating the transmitting signals, as well as decoding and demodulating the receiving signals; a mobile station control unit 27 for carrying out a control of the operation in the mobile station and a generation of a control signal for the base station; an operation unit 29 formed by a man-machine interface such as dial buttons; and an input/output circuit 31 for carrying out input and output processing for the speech or the user data.

Figure 3B:
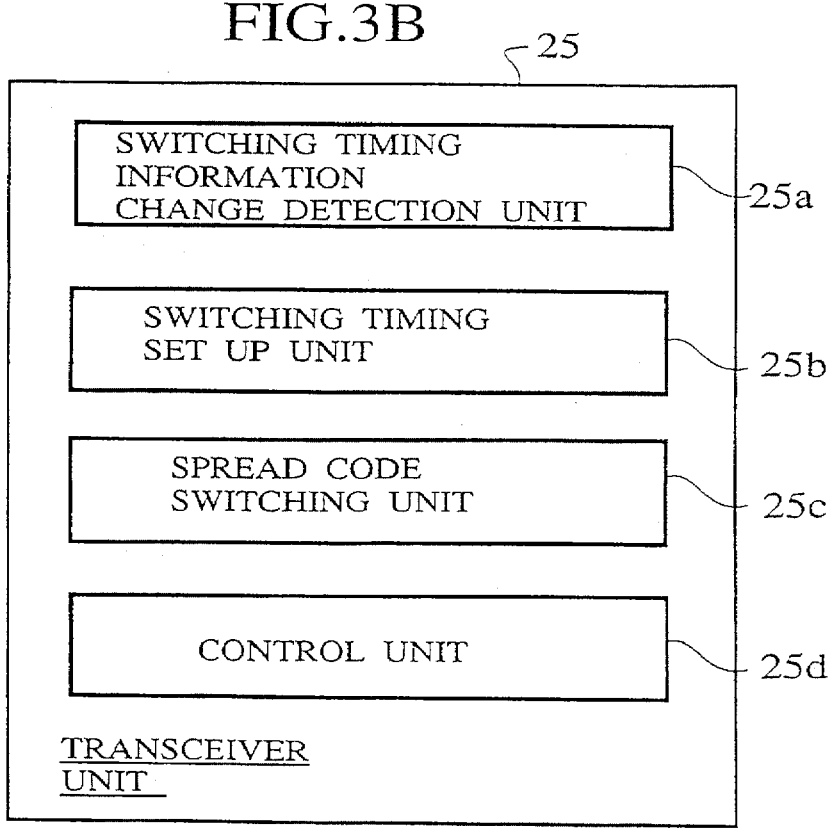
FIG. 3B is a schematic block diagram of a transceiver unit in the mobile station of FIG. 3A.

Here, as shown in FIG. 3B, the transceiver unit 25 includes a switching timing information change detection unit 25a, a switching timing set up unit 25b, a spread code switching unit 25c, and a control unit 25d for controlling the operation in the transceiver unit 25.

Next, the first embodiment of the radio link switching scheme according to the present invention will be described with reference to the sequence chart of FIG. 4.

Namely, in this first embodiment, the radio link switching scheme is carried out according to the sequence chart of FIG. 4 as follows.

Initially, it is assumed that the transceiver unit 15 of the base station and the transceiver unit 25 of the mobile station is in communication by setting up a certain radio link.

Then, when the transceiver unit 15 of the base station detects the quality degradation of that certain radio link (step S1), the transceiver unit 15 notifies this quality degradation to the control unit 17 of the base station (step S3).

Figure 5:
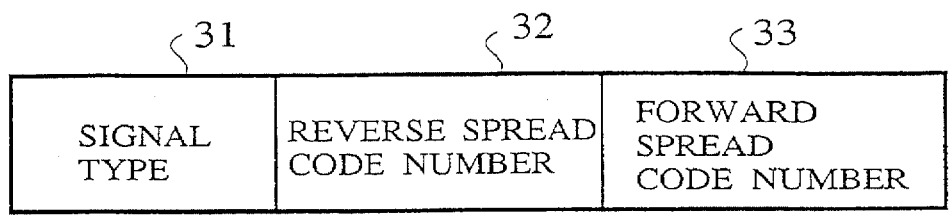
FIG. 5 is a signal form diagram for a new spread code designation signal used in the scheme of FIG. 4.

In response, the control unit 17 selects the unused spread codes of the switching target for each of the reverse link (mobile station→base station) and the forward link (base station→mobile station) (step S5), and transmits the new spread code designation signal containing the selected spread codes to the mobile station by using the radio link before the switching (step S7). Here, the new spread code designation signal has an exemplary form as shown in FIG. 5 which comprises a signal type 31 indicating that this signal is the new spread code designation signal, a reverse spread code number 32 indicating the selected spread code for the reverse link, and a forward spread code number 33 indicating the selected spread code for the foward link.

Then, the control unit 27 of the mobile station which received this new spread code designation signal stores the reverse and forward spread code numbers 32 and 33, and returns the new spread code designation confirmation signal as an acknowledge to the base station (step S9).

Next, the control unit 17 of the base station which received the new spread code designation confirmation signal from the control unit 27 of the mobile station then notifies the spread codes for the reverse and forward links to be used in the new radio link to the transceiver unit 15 (step S11). The transceiver unit 15 of the base station which received this notice then stores the notified spread codes for the reverse and forward links, and returns the new spread code confirmation to the control unit 17 (step S13).

Next, in the transceiver unit 15 of the base station, an appropriate switching timing is set up at the switching timing set up unit 15a (step S15), and the switching timing information contained in a frame in a prescribed relation with respect to the switching timing set up at the switching timing set up unit 15a is changed in a manner described in detail below by the switching timing information changing unit 15b and the frame containing the changed switching timing information is transmitted to the transceiver unit 25 of the mobile station (step S17).

Then, in the transceiver unit 25 of the mobile station, whether the switching timing information contained in the received frame is changed or not is checked by the switching timing information change detection unit 25a, and when the switching timing information change is detected (step S21), the switching timing is set up at the switching timing set up unit 25b in a prescribed relation with respect to the frame containing the changed switching timing information detected (step S23) such that the switching timing set up in the mobile station is identical to the switching timing set up in the base station.

Finally, the spread code switching unit 15c of the transceiver unit 15 of the base station carries out the switching of the spread code at the switching timing set up at the switching timing set up unit 15a, while the spread code switching unit 25c of the transceiver unit 25 of the mobile station carries out the switching of the spread code at the switching timing set up at the switching timing set up unit 25b, so as to realize the simultaneous switching of the spread code at the base station and the mobile station (step S25). After the switching is completed, the transceiver unit 15 of the base station and the transceiver unit 25 of the mobile station notify the completion of the spread code switching to the respective control units 17 and 27.

It is to be noted that, in a case the frame timing is not coinciding in the reverse link and the forward link, it suffices for the forward link to carry out the spread code switching on both the base station and the mobile station at a prescribed number of frames after the frame containing the switching timing information that has been changed at the base station. As for the reverse link, it suffices to carry out the spread code switching on both the base station and the mobile station at a prescribed number of frames after the frame which is closest to the frame in the forward link which contains the switching timing information that has been changed at the base station.

Figure 4:
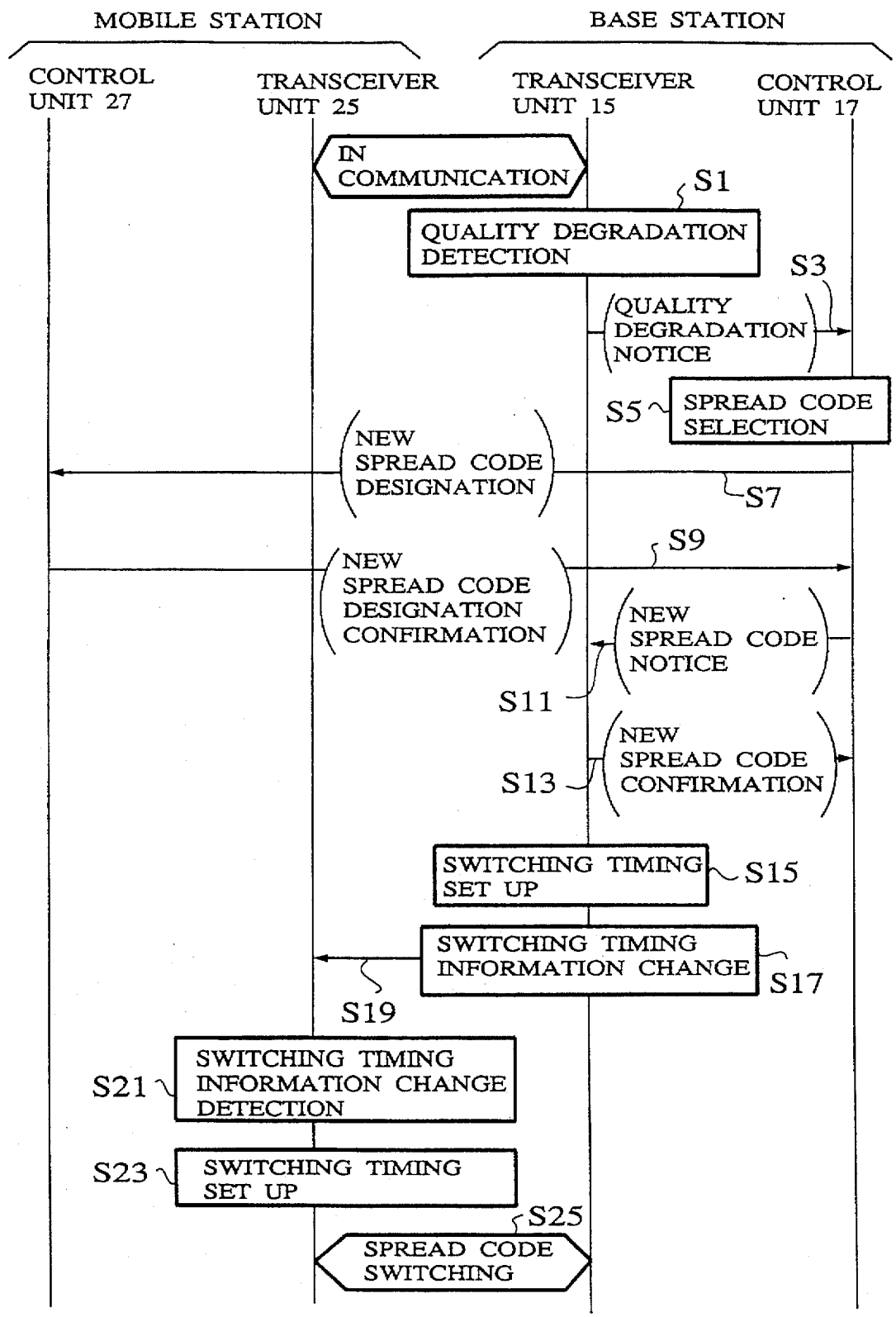
FIG. 4 is a sequence chart for the first embodiment of a radio link switching scheme according to the present invention.

Also, in this procedure of FIG. 4, in switching the spread codes at the base station and the mobile station, the synchronization state before the switching is maintained, and the signal transmission is carried out in the same synchronization state even after the switching. In the intra-base station radio link switching, the distance between the base station and the mobile station is hardly changed immediately before and immediately after the switching so that the synchronization timing is also hardly changed. Consequently, the synchronization timing can be maintained at a time of switching without any problem.

Here, in a case the switching timing information detection processing result satisfies the out of synchronization condition during the radio link switching operation, the radio link switching operation is cleared and the synchronization establishment processing in the old radio link is carried out. However, even when it fails to detect the switching timing information in a certain frame during the radio link switching operation, as long as the out of synchronization condition is not satisfied by the time immediately before the spread code switching timing, it is judged that it is not out of the synchronization, and the switching of the spread codes is carried out.

Thus, according to this first embodiment, it is possible to complete the radio link switching within the same transceiver unit 15 of the base station, so that there is no need for the switching of the wire link connected to the transceiver unit 15 at the exchange station side. Also, by carrying out the switching at the same timing on both of the mobile station and the base station, it is possible to prevent the occurrence of the period in which the communication is impossible, and further by maintaining the synchronization state at a time of the switching, it is also possible to eliminate the synchronization establishment processing for the new radio link, so that the breaking of the communication due to the synchronization establishment processing can be prevented. Here, the maintaining the same synchronization state can be done very easily as only one transceiver unit of the base station is involved in the radio link switching operation of this first embodiment.

Here, in order to prevent the breaking of the communication, it is also necessary for the time required for the radio link switching, i.e., the time required in changing the radio link parameter within the transceiver unit, to be sufficiently shorter than the signal transmission rate. In other words, the upper limit of the signal transmission rate is determined by the time required in changing the radio link parameter. In this regard, the CDMA is suitable for the high speed signal transmission rate because the change of the radio link parameter in the CDMA is the change of the spread code set up in the correlator which can be realized at a high speed very easily. Consequently, the use of the CDMA is advantageous in this first embodiment.

Now, in this first embodiment, the switching timing information to be provided in each frame used in the above procedure can be given by the layer 1 bit data in general, and there are several possible choices for this layer 1 bit data including the following cases.

As a first case, the switching timing information can be given by the so called unique word (UW) which is provided for the purpose of the maintaining the frame synchronization in the synchronization establishment processing, and includes two types of UW0 and UW1. Here, UW0 and UW1 have a sufficient Hamming distance from each other such that the probability for confusing these two types is very low.

Figure 6:
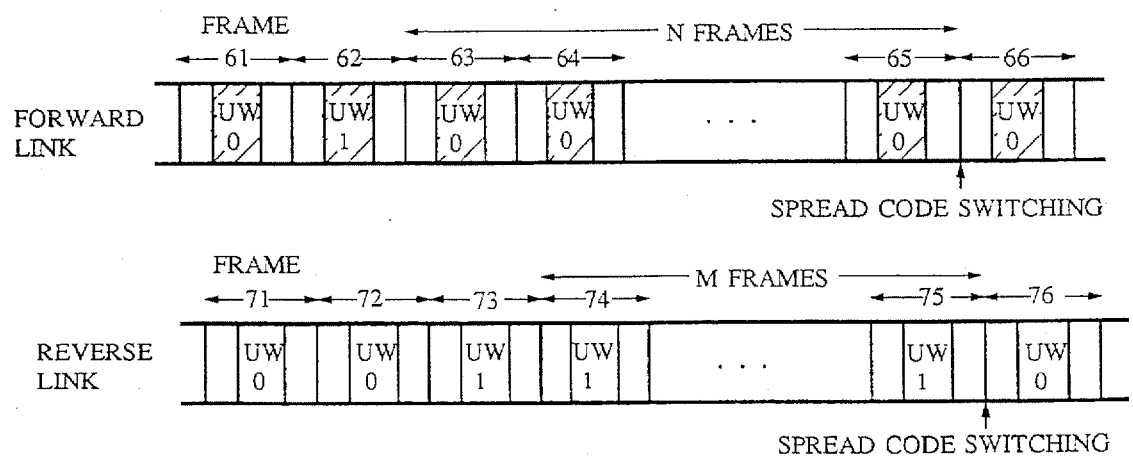
FIG. 6 is a diagram of transmission signals in the scheme of FIG. 4 for explaining the first case of using a unique word as the switching timing information.

In this case, as shown in FIG. 6, the transceiver unit 15 of the base station normally uses UW0 as the switching timing information for the forward link as in the frame 61. Then, at the step S17 of FIG. 4, the transceiver unit 15 changes the switching timing information to UW1 as in the frame 62. Thereafter, the transceiver unit 15 uses UW0 again as in the subsequent frames 63 to 66.

Similarly, the transceiver unit 25 of the mobile station normally uses UW0 as the switching timing information in the reverse link as in the frame 71.

Meanwhile, the transceiver unit 25 of the mobile station regularly monitors the switching timing information in the forward link to detect UW0 normally. Then, whenever UW0 cannot be detected, the transceiver unit 25 carries out the detection of UW1, and when UW1 is detected, the transceiver unit 25 recognizes the start of the radio link switching operation. In response, as an acknowledgement of the start of the radio link switching operation, the transceiver unit 25 changes the switching timing information in the forward link to UW1 as in the frame 73. Here, the frame 73 is the first frame in the reverse link for which the switching timing information can be changed since the detection of UW1 in the forward link in the frame 62. Thereafter the transceiver unit 25 continues to use UW1 until the spread code switching timing as in the frames 74 and 75.

On the other hand, the transceiver unit 15 of the base station regularly monitors the switching timing information in the reverse link to detect UW0 normally. However, at the frames 73 to 75 for which UW1 is expected to be used in the reverse link, the transceiver unit 15 carries out the detection of UW1, and when UW1 cannot be detected, the transceiver unit 15 carries out the detection of UW0. In a case even UW0 cannot be detected, it is judged that no synchronization according to the unique word can be made for that frame so that the synchronization state is maintained, and it proceeds to carry out the similar operation for the next frame.

Then, at both of the transceiver unit 15 of the base station and the transceiver unit 25 of the mobile station, for the forward link, the switching timing is set as N frames after the frame 62 in which UW1 is used by the base station, whereas for the reverse link, the switching timing is set as M frames after the frame 73 in which UW1 can be expected to be used first by the mobile station.

The transceiver unit 15 of the base station judges that the notification of the switching timing to the mobile station was successful whenever at least one UW1 is detected between the frame 73 in which UW1 is expected to be used first in the reverse link and the frame 75 immediately before the switching timing in the reverse link. In this case, the spread codes for the reverse and forward links are switched to those selected at the step S5 of FIG. 4 at the respective switching timings as described above.

On the contrary, the transceiver unit 15 of the base station judges that the notification of the switching timing to the mobile station was unsuccessful as the transceiver unit 25 of the mobile station failed to detect UW1 in the forward link whenever at least one UW0 is detected between the frame 73 in which UW1 is expected to be used first in the reverse link and the frame 75 immediately before the switching timing in the reverse link. In this case, the transceiver unit 15 uses UW1 again in the forward link to re-start the radio link switching operation.

On the other hand, the transceiver unit 25 of the mobile station switches the spread codes for the reverse and forward links to those designated at the step S7 of FIG. 4 at the respective switching timings as described above, whenever UW1 is detected in the forward link.

After the switching of the spread codes, the transceiver unit 15 of the base station and the transceiver unit 25 of the mobile station resume the communication using UW0 as normal.

Figure 7:
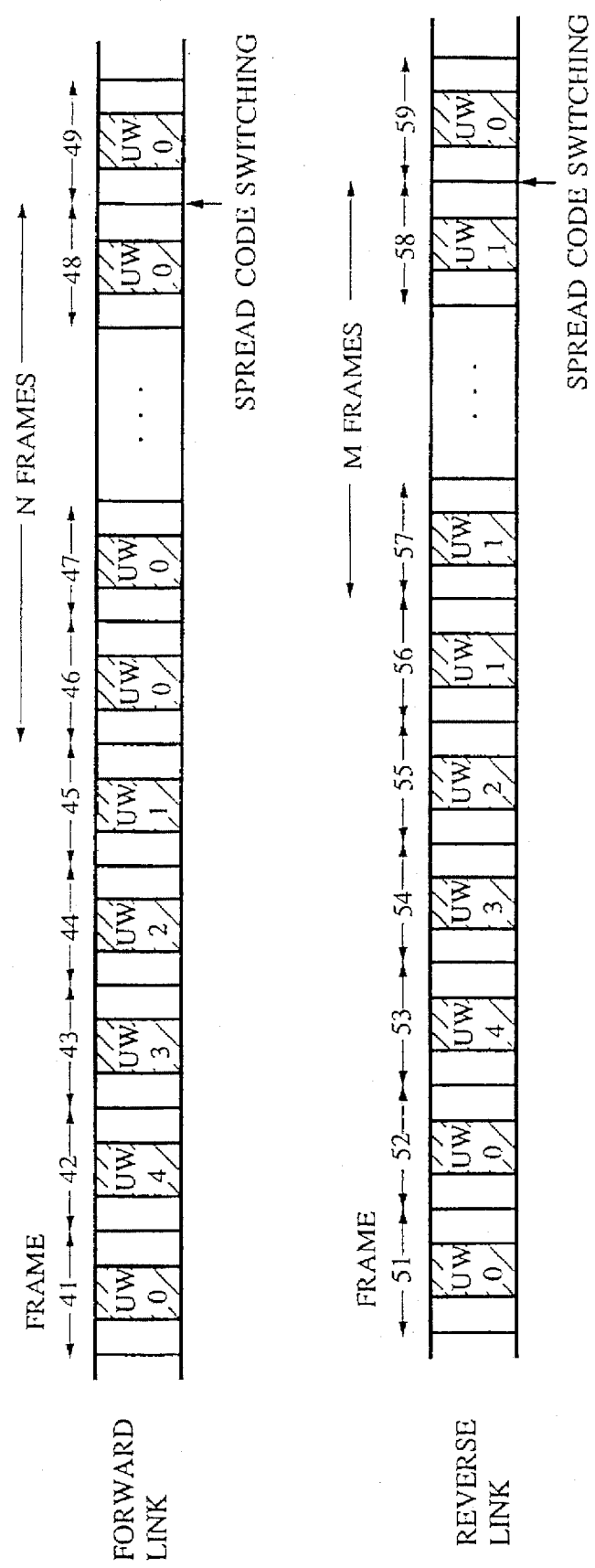
FIG. 7 is a diagram of transmission signals in the scheme of FIG. 4 for explaining a modification of the first case of using a unique word as the switching timing information.

It is also possible to modify this first case of using the unique word as the switching timing information as follows. Namely, as shown in FIG. 7, it is possible to use five different types of the unique words including UW0, UW1, UW2, UW3, and UW4. Here, the different types of the unique word have a sufficient Hamming distance from each other such that the probability for confusing any two types is very low.

In this case, as shown in FIG. 7, the transceiver unit 15 of the base station normally uses UW0 as the switching timing information for the forward link as in the frame 41. Then, at the step S17 of FIG. 4, the transceiver unit 15 sequentially changes the switching timing information to UW4 as in the frame 42, UW3 as in the frame 43, UW2 as in the frame 44, and UW1 as in the frame 45. Thereafter, the transceiver unit 15 uses UW0 again as in the subsequent frames 46 to 49.

Similarly, the transceiver unit 25 of the mobile station normally uses UW0 as the switching timing information in the reverse link as in the frame 51.

Meanwhile, the transceiver unit 25 of the mobile station regularly monitors the switching timing information in the forward link to detect UW0 normally. Then, whenever UW0 cannot be detected, the transceiver unit 25 sequentially carries out the detection of UW4 to UW1, and when any one of UW4 to UW1 is detected, the transceiver unit 25 recognizes the start of the radio link switching operation. In response, as an acknowledgement of the start of the radio link switching operation, the transceiver unit 25 sequentially changes the switching timing information in the forward link to UW4 as in the frame 53, UW3 as in the frame 54, UW2 as in the frame 55, and UW1 as in the frame 56. Here, the frame 53 is the first frame in the reverse link for which the switching timing information can be changed since the detection of UW4 in the forward link in the frame 42. Thereafter the transceiver unit 25 continues to use UW1 until the spread code switching timing as in the frames 57 and 58.

Here, the transceiver unit 25 of the mobile station sequentially carries out the detection of the expected type of the unique word during the period since any one of UW4 to UW1 is detected until the spread code switching timing (i.e., the period between the frame 42 to the frame 48). Thus, in a case UW4 is detected in the frame 42, the detection processing of UW3, UW2, and UW1 is sequentially carried out in the frames 43, 44, and 45, and the detection processing of UW0 is carried out in the subsequent frames 46 to 48. In a case the expected type of the unique word cannot be detected, it is judged that no synchronization by the unique word can be made in that frame so that the synchronization state is maintained, and it proceeds to carry out the similar operation for the next frame. For instance, when it fail to detect UW3 in the frame 43, the synchronization state is maintained and it proceeds to the detection processing of UW2 in the frame 44.

On the other hand, the transceiver unit 15 of the base station regularly monitors the switching timing information in the reverse link to detect UW0 normally. However, at the frames 53 to 58 for which UW4 to UW1 are expected to be used in the reverse link in correspondence to the UW4 to UW1 used in the forward link, the transceiver unit 15 sequentially carries out the detection of UW4 to UW1. Thus, the detection processing of UW4, UW3, and UW2 is sequentially carried out in the frames 53, 54, and 55, and the detection processing of UW1 is carried out in the subsequent frames 56 to 58. In a case the expected type of the unique word cannot be detected in the frame in which UW4 to UW2 are expected to be used, it is judged that no synchronization by the unique word can be made in that frame so that the synchronization state is maintained, and it proceeds to carry out the similar operation for the next frame. For instance, when it fail to detect UW3 in the frame 54, the synchronization state is maintained and it proceeds to the detection processing of UW2 in the frame 55. Also, when UW1 cannot be detected in the frame in which UW1 is expected to be used, the transceiver unit 15 carries out the detection of UW0. In a case even UW0 cannot be detected, it is judged that no synchronization by the unique word can be made in that frame so that the synchronization state is maintained, and it proceeds to carry out the similar operation for the next frame.

Then, at both of the transceiver unit 15 of the base station and the transceiver unit 25 of the mobile station, for the forward link, the switching timing is set as N frames after the frame 45 in which UW1 is used by the base station, whereas for the reverse link, the switching timing is set as M frames after the frame 56 in which UW1 is expected to be used first by the mobile station.

The transceiver unit 15 of the base station judges that the notification of the switching timing to the mobile station was successful whenever at least one of UW4 to UW1 is detected at the expected frame between the frame 53 in which UW4 is expected to be used in the reverse link and the frame 58 immediately before the switching timing in the reverse link. In this case, the spread codes for the reverse and forward links are switched to those selected at the step S5 of FIG. 4 at the respective switching timings as described above.

On the contrary, the transceiver unit 15 of the base station judges that the notification of the switching timing to the mobile station was unsuccessful whenever at least one UW0 is detected between the frame 53 in which UW4 is expected to be used in the reverse link and the frame 58 immediately before the switching timing in the reverse link. In this case, the transceiver unit 15 uses UW4 again in the forward link to re-start the radio link switching operation.

On the other hand, the transceiver unit 25 of the mobile station switches the spread codes for the reverse and forward links to those designated at the step S7 of FIG. 4 at the respective switching timings as described above, whenever any one of UW4 to UW1 is detected in the forward link.

After the switching of the spread codes, the transceiver unit 15 of the base station and the transceiver unit 25 of the mobile station resume the communication using UW0 as normal.

In this modification of the first case, it is possible for the transceiver unit 25 of the mobile station to recognize the start of the spread code switching operation as well as the spread code switching timing by detecting any one of UW4 to UW1 in the forward link in four frames in which UW4 to UW1 are used, so that even under the circumstances in which it is difficult to detect the change of the switching timing information in the forward link due to the degradation of the quality in the radio section, it is possible to increase the chance for successfully completing the radio link switching operation.

Here, in a case the transmission error rate in the radio section is high, in order to increase the chance of successfully notifying the start of the switching operation from the base station to the mobile station, it is necessary to increase a number of types of the unique word used. However, when the number of types of the unique word used is increased, the switching timing is delayed as much, such that the lowering of the service quality can be caused as the period of time in which the quality is degraded becomes longer in the state in which the quality is degraded in the radio section, and the probability for the link disconnection to occur before the switching is completed becomes higher. Moreover, as the number of types of the unique word used increases, it becomes more difficult to provide an ample Hamming distance between any two types of the unique word. Consequently, it is not necessarily preferable to increase the number of types of the unique word used unlimitedly, and the suitable number of types of the unique word to be used should be determined in view of the above noted factors.

It is also to be noted that, in this first case, the spread code switching timing may not necessarily be set to be a predetermined number of frames after the reference timing at which a particular type of the unique word is used as described above, and can be set to be any desired timing if desired.

It is also to be noted that the procedures using the reverse and forward links in this first case as explained with references to FIG. 8 and FIG. 7 above are equally applicable to the second, third, and the fourth cases described below.

Next, as a second case, the switching timing information can be given by the flag in each frame which is in a state of either ON or OFF.

Figure 8:
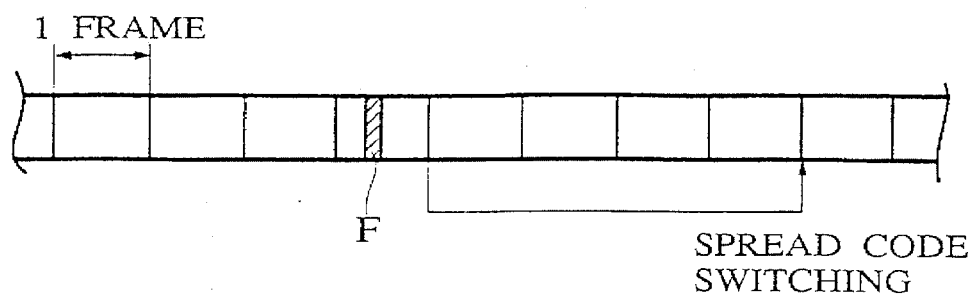
FIG. 8 is a diagram of a transmission signal in the scheme of FIG. 4 for explaining the second case of using a flag in each frame as the switching timing information.

Namely, as shown in FIG. 8, a flag F can be set to be ON in a particular frame, and the simultaneous radio link switching timing for both the base station and the mobile station is set up to be a prescribed period of time after this frame with the flag ON. In FIG. 8, the switching timing is set to be a timing of a boundary of four frames after this frame with the flag ON for example.

In this case, the transceiver unit 15 of the base station normally sets the flag of each frame OFF as the switching timing information, and at the step S17 of FIG. 4, the transceiver unit 15 changes the switching timing information by setting the flag ON. Then, the transceiver unit 15 sets the flag of each frame OFF again for the subsequent frames.

On the other hand, the transceiver unit 25 of the mobile station regularly monitors the switching timing information given by the flag in the frames transmitted from the base station to check if the flag is ON. Then, whenever the flag is detected to be ON, the transceiver unit 25 recognizes the start of the radio link switching operation, and the switching timing is set to be a prescribed period of time after this frame with the flag ON, such as a timing of a boundary of four frames after this frame with the flag ON for example.

Here, instead of constantly fixing the switching timing with respect to the frame with the flag ON as described above, it is also possible to provide a multi-valued flag whose value indicates a number of frames until the switching timing, as in the flag with a value 5 indicating 5 frames to go, the flag with a value 4 indicating 4 frames to go, and so on, for example.

Figure 9:
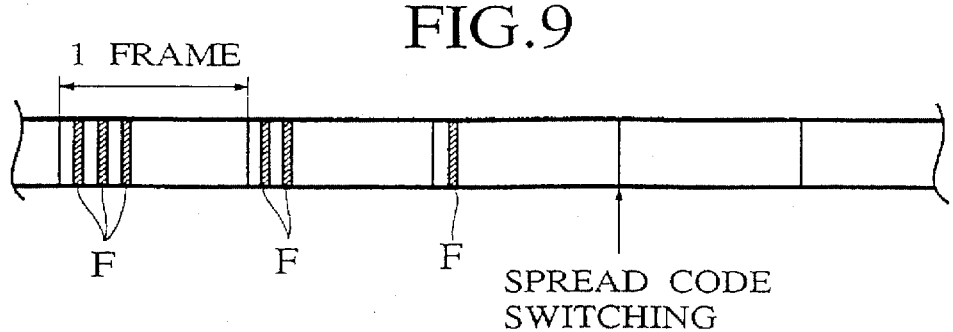
FIG. 9 is a diagram of a transmission signal in the scheme of FIG. 4 for explaining one modification of the second case of using a flag in each frame as the switching timing information.

It is also possible to modify this second case of using the flag as the switching timing information as shown in FIG. 9, in which different numbers of flags are used in prescribed number of frames preceding the switching timing, in order to prevent the overlooking of the switching timing information in a form of the flag. For example, in FIG. 9, a number of flags in each frame indicating a number of frames until the switching timing, so that a number of flags sequentially decreases as the switching timing approaches. In this case, even when the first frame with three flags F is overlooked or not recognized due to the poor communication state, as long as the subsequent frame with the decreased number of flags F can be detected, it is possible to carry out the radio link switching surely at the prescribed switching timing after the last frame with only one flag F.

Figure 10:
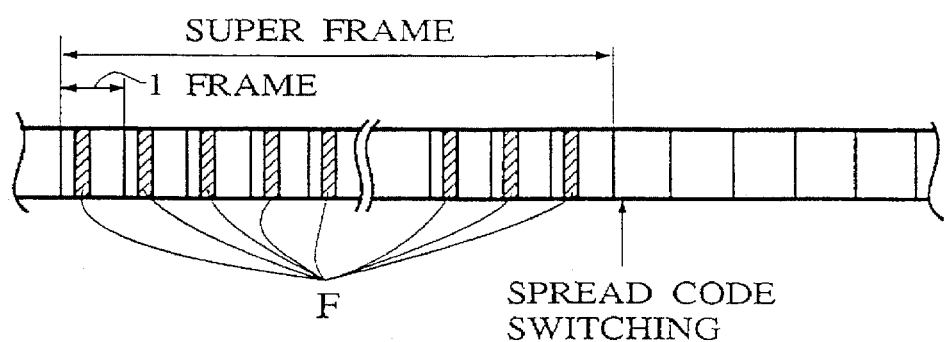
FIG. 10 is a diagram of a transmission signal in the scheme of FIG. 4 for explaining another modification of the second case of using a flag in each frame as the switching timing information.

It is also possible to modify this second case of using the flag as the switching timing information by using the super frame as shown in FIG. 10. Namely, in a case of the PDC (Personal Digital Cellular), one super frame is defined by a series of 36 frames, and the flag F can be set, to be ON in each and every frame of the super frame as indicated in FIG. 10, while the switching timing is set to be at a boundary between this super frame and a next super frame.

Figure 11:
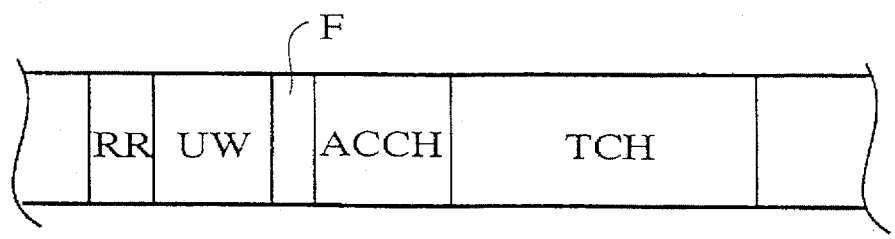
FIG. 11 is a signal form diagram of a transmission signal in the second case of using a flag in each frame as the switching timing information.

In this second case, the flag F can be located in each frame at a position as indicated in FIG. 11, between the unique word UW and the associated control link ACCH provided between the preamble PR and the communication link TCH.

Next, as a third case, the switching timing information can be given by the flag in the so called housekeeping bit which is in a state of either ON or OFF. The housekeeping bit is an information utilized in many mobile communication system such as the digital mobile telephone system currently in practical use, in order to notify the data such as the receiving power level or the bit error rate of the communication link during the communication between the mobile station and the base station, for the purpose of controlling the transmission power and detecting the quality degradation of the radio link at the communication station. This housekeeping bit is usually contained in a selected number of frames among the transmission frames, and formed by using the error correction/detection code so that the highly reliable signal transmission can be guaranteed for this housekeeping bit. In this third case, the flag is provided in this highly reliable housekeeping bit, such that it becomes possible to realize the highly reliable notification of the switching timing from the base station to the mobile station.

Figure 12:
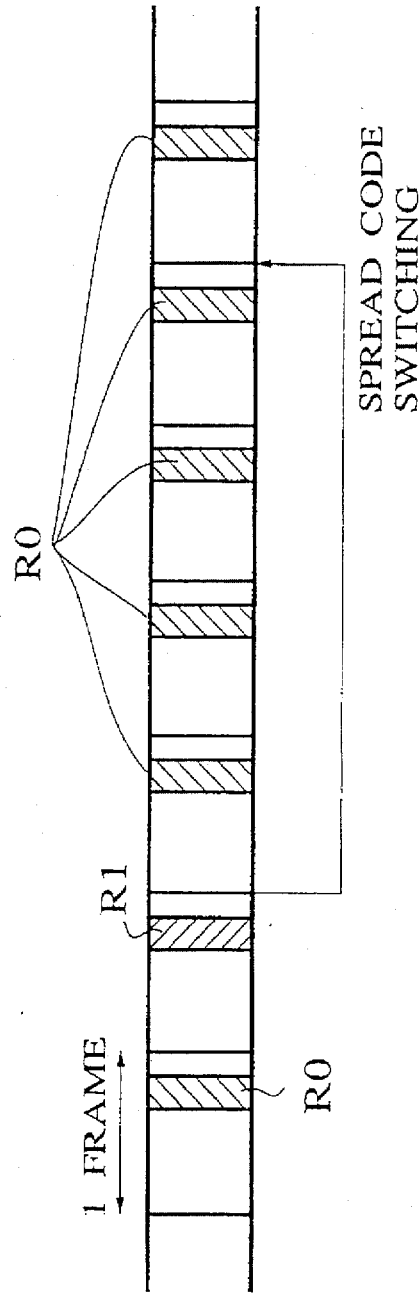
FIG. 12 is a diagram of a transmission signal in the scheme of FIG. 4 for explaining the third case of using a flag in a housekeeping bit as the switching timing information.

In this case, as shown in FIG. 12, the housekeeping bit can be provided in every frame, and the transceiver unit 15 of the base station normally uses the housekeeping bit R0 with the flag OFF as the switching timing information. Then, at the step S17 of FIG. 4, the transceiver unit 15 changes the switching timing information by setting the flag in the housekeeping bit ON (housekeeping bit R1). Then, the transceiver unit 15 sets the flag of the housekeeping bit OFF (housekeeping bit R0) again for the subsequent frames. The simultaneous radio link switching timing for both the base station and the mobile station is set up to be a prescribed period of time after the housekeeping bit R1 with the flag ON. In FIG. 12, the switching timing is set to be a timing of a boundary of four frames after the frame containing the housekeeping bit R1 with the flag ON for example.

On the other hand, the transceiver unit 25 of the mobile station regularly monitors the switching timing information given by the flag in the housekeeping bit in the frames transmitted from the base station to check if the flag is ON. Then, whenever the flag is detected to be ON, the transceiver unit 25 recognizes the start of the radio link switching operation, and the switching timing is set to be a prescribed period of time after this housekeeping bit R1 with the flag ON, such as a timing of a boundary of four frames after the frame containing the housekeeping bit R1 with the flag ON for example.

Here, just as in the second case described above, instead of constantly fixing the switching timing with respect to the frame containing the housekeeping bit R1 with the flag ON as described above, it is also possible to provide a multi-valued flag whose value indicates a number of frames until the switching timing, as in the flag with a value 5 indicating 5 frames to go, the flag with a value 4 indicating 4 frames to go, and so on, for example.

Figure 13:
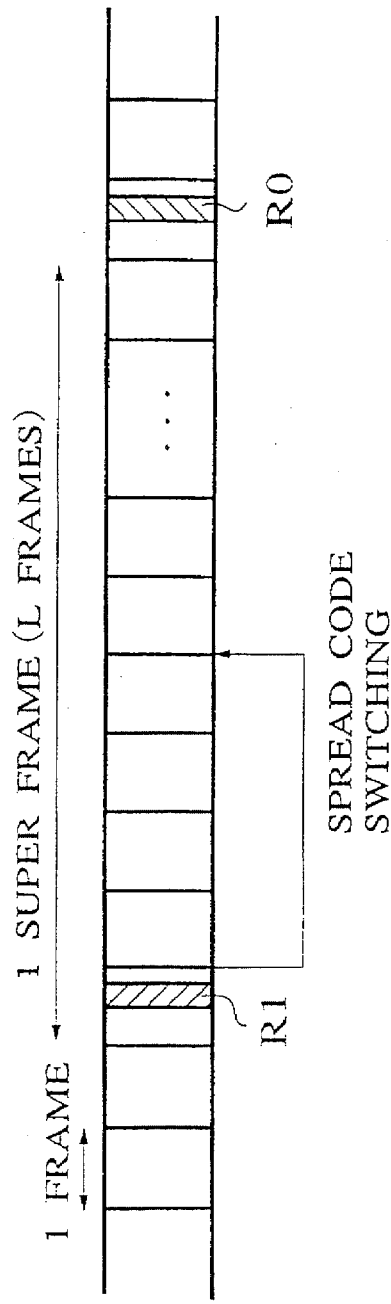
FIG. 13 is a diagram of a transmission signal in the scheme of FIG. 4 for explaining one modification of the third case of using a flag in a housekeeping bit as the switching timing information.

It is also possible, as shown in FIG. 13, to provide the housekeeping bit periodically in selected frames. In FIG. 13, the transmission signal is given in a unit of a super frame formed by L frames, in which only the first frame of the super frame contains the housekeeping bit. Here, as in a case of FIG. 12 described above, the transceiver unit 15 of the base station normally uses the housekeeping bit R0 with the flag OFF as the switching timing information, and changes the switching timing information by setting the flag in the housekeeping bit ON (housekeeping bit R1) at the first frame of an appropriate super frame. Then, the transceiver unit 15 sets the flag of the housekeeping bit OFF (housekeeping bit R0) again for the subsequent super frames. The simultaneous radio link switching timing for both the base station and the mobile station is set up to be a prescribed period of time after the housekeeping bit R1 with the flag ON. In FIG. 13, the switching timing is set to be a timing of a boundary of four frames after the frame containing the housekeeping bit R1 with the flag ON for example.

Figure 14:
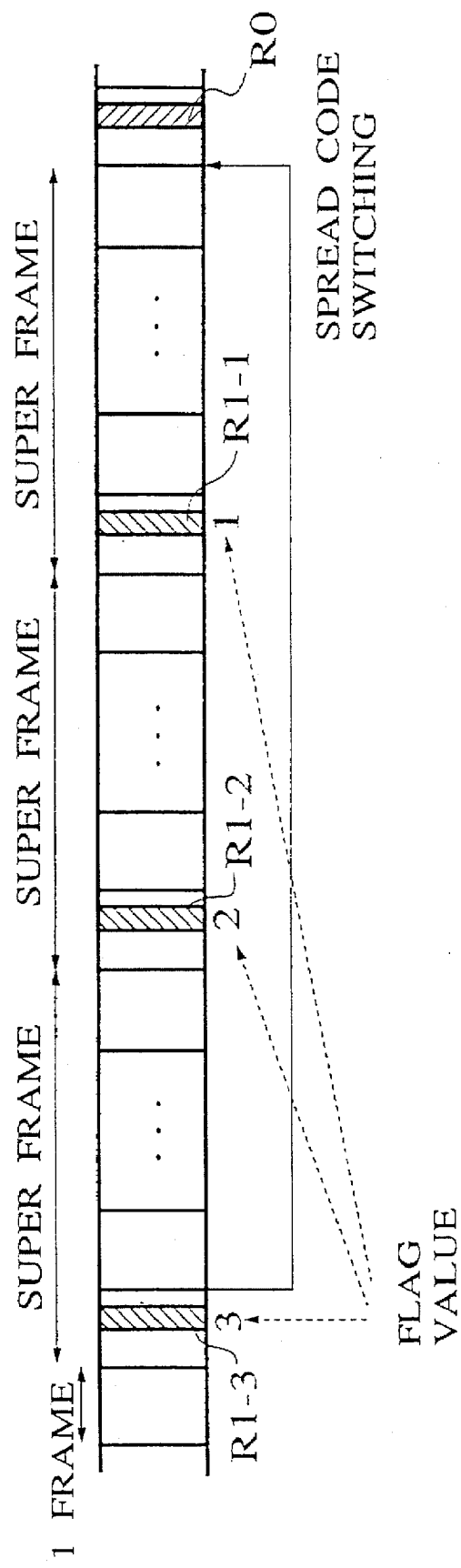
FIG. 14 is a diagram of a transmission signal in the scheme of FIG. 4 for explaining another modification of the third case of using a flag in a housekeeping bit as the switching timing information.

Here, just as described above, instead of constantly fixing the switching timing with respect to the frame containing the housekeeping bit R1 with the flag ON as described above, it is also possible to provide a multi-valued flag whose value indicates a number of frames until the switching timing. For example as shown in FIG. 14, the housekeeping bit R1-3 having the flag with a value 3 indicates that it is 3 super frames before the switching timing, the housekeeping bit R1-2 having the flag with a value 2 indicates that it is 2 super frames before the switching timing, and the housekeeping bit R1-1 having the flag with a value 1 indicates that it is 1 super frame before the switching timing. In this manner, even when the first super frame with the housekeeping bit R1-3 having the flag with a value 3 is overlooked or not recognized due to the poor communication state, as long as the subsequent super frame with the housekeeping bit having the flag with a decreased value can be detected, it is possible for the mobile station to recognize the radio link switching timing, so that the rate of success of the radio link switching can be increased.

Figure 15:
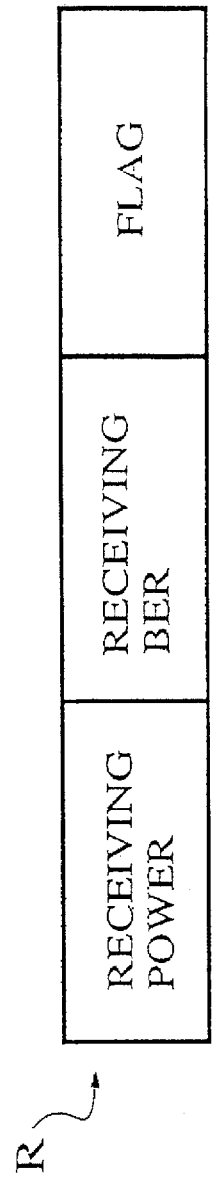
FIG. 15 is a signal form diagram of a transmission signal in the third case of using a flag in a housekeeping bit as the switching timing information.

In this third case, the housekeeping bit R is given in a form shown in FIG. 15, which comprises a receiving power data, the receiving bit error rate (BER) data, and the flag. Here, the flag can be given by one bit in a case it takes only two states of ON and OFF, or by a plurality of bits in a case it takes multiple values.

Next, as a fourth case, the switching timing information can be given by the frame number labelling each frame.

Figure 16:
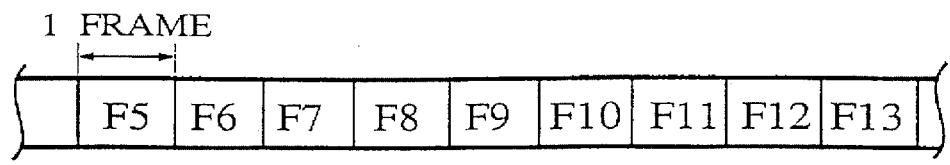
FIG. 16 is a diagram of a transmission signal in the scheme of FIG. 4 for explaining a frame number.
Figure 17:
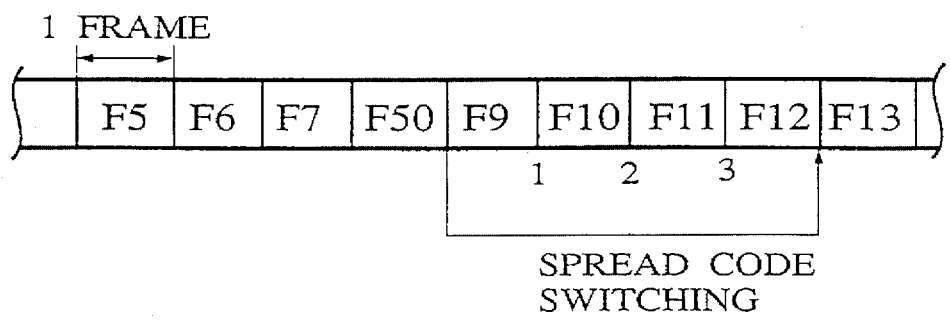
FIG. 17 is a diagram of a transmission signal in the scheme of FIG. 4 for explaining the fourth case of using a frame number as the switching timing information.

In this case, as shown in FIG. 16, the frames are assigned with serial frame numbers. Then, the transceiver unit 15 of the base station normally uses the frame numbers in the serial order as the switching timing information. Then, at the step S17 of FIG. 4, as shown in FIG. 17, the transceiver unit 15 changes the switching timing information by changing the frame number of an appropriate frame to be discontinuous with respect to the frame number of the preceding frame and the frame number of the following frame. In FIG. 17, the frame number of the frame between the frame number F7 and the frame number F9 which would normally be F8 is changed to F50 to make the sequence of the frame number discontinuous. Then, the simultaneous radio link switching timing for both the base station and the mobile station is set up to be a prescribed period of time after this frame with the changed frame number. In FIG. 17, the switching timing is set to be a timing of a boundary of four frames after the frame with the changed frame number F50 for example.

On the other hand, the transceiver unit 25 of the mobile station regularly monitors the switching timing information given by the frame number of the frames transmitted from the base station to check if the frame number is discontinuous. Then, whenever the discontinuous frame number is detected, the transceiver unit 25 recognizes the start of the radio link switching operation, and the switching timing is set to be a prescribed period of time after this frame with the discontinuous frame number, such as a timing of a boundary of four frames after this frame with the discontinuous frame number for example.

Here, just as in the second and third cases described above, instead of constantly fixing the switching timing with respect to the frame with the changed frame number as described above, it is also possible to associate meaning related to the number of frames until the switching timing to the changed frame number, as in the frame number 50 indicating 5 frames to go, the frame number 40 indicating 4 frames to go, and so on, for example. Any other symbols other than the numerals may also be used to associate the meaning to the changed frame number.

Figure 18:
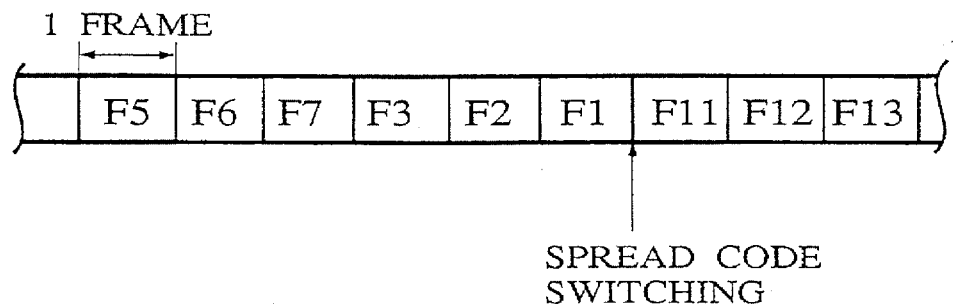
FIG. 18 is a diagram of a transmission signal in the scheme of FIG. 4 for explaining one modification of the fourth case of using a frame number as the switching timing information.
Figure 19:
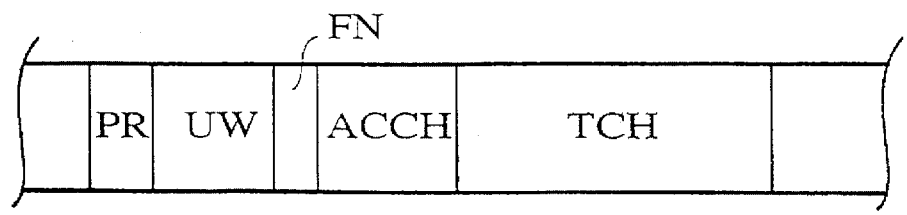
FIG. 19 is a signal form diagram of a transmission signal in the fourth case of using a frame number as the switching timing information.

It is also possible to change the frame number as shown in FIG. 18, in which the serially increasing frame number is changed such that the changed frame number indicates a number of frames until the switching timing in a prescribed number of frames before the switching timing. Thus, in FIG. 18, the frame numbers of three frames after the frame number F7 which would normally be F8, F9, and F10 in the serial order are changed to F3, F2, and F1 indicating that it is 3, 2, and 1 frames before the switching timing, respectively. In this manner, even when the first frame with the changed frame number F3 is overlooked or not recognized due to the poor communication state, as long as the subsequent frame with the sequentially decreasing changed frame number can be detected, it is possible for the mobile station to recognize the radio link switching timing, so that the rate of success of the radio link switching can be increased.

It is to be noted here that, in a case of changing the frame number in a plurality of frames before the switching timing, it is necessary to give a due consideration to a number of frames for which the frame numbers are to be changed. Namely, in the normal communication, the frames are presupposed to be transmitted in an order of the frame numbers, so that the change of the frame numbers in only a small number of frames causes no problem but the use of the changed frame numbers in excessively large number of frames can make it impossible to carry out the frame transmission and reception order control.

In this fourth case, the frame number FN can be located in each frame at a position as indicated in FIG. 9, between the unique word UW and the associated control link ACCH provided between the preamble PR and the communication link TCH.

It is to be noted here that, in any of the above described first to fourth cases, the switching timing information of the present invention in general can indicate the time until the switching timing either directly or indirectly, in one or more frames.

Now, in the first embodiment described above, a manner of determining a number of frames in which the changed switching timing information is to be provided during a period between the occurrence of the need for the radio link switching and the switching timing is left unspecified.

In this regard, when the number of frames containing the changed switching timing information is fixed to a small number, the rate of frame reception failure at the mobile station becomes high in a case the radio link quality is degraded considerably, so that the probability for the failure of notifying the changed switching timing information to the mobile station becomes high and in turn the probability for the failure of the radio link switching operation becomes high.

On the other hand, when the number of frames containing the changed switching timing information is fixed to a large number, the period of time required between the radio link switching request and the radio link switching timing is going to be considerably long all the times, so that it becomes difficult to carry out the radio link switching at appropriate timings. Moreover, when the frame number is used as the switching timing information while the number of frames containing the changed switching timing information is fixed to a large number, the period of time during which the designation of the order of frame transmission by the frame number cannot be made becomes considerably long, and it becomes more likely to cause the trouble in the order control of the received frames at the mobile station.

In order to remove these potential problems of the first embodiment, the preferable manner of determining a number of frames in which the changed switching timing information is to be provided during a period between the occurrence of the need for the radio link switching and the switching timing can be specified as in the second embodiment of the radio link switching scheme according to the present invention which will now be described in detail.

In the following, for the sake of explanation, the second embodiment will be described for an exemplary case of using the frame number as the switching timing information as in the fourth case of the first embodiment described above, the CDMA scheme as the access scheme as in the first embodiment described above, and the SIR (Signal Interference Ratio) indicating a ratio of a signal radio wave receiving level and an interference radio wave receiving level as the quality of the radio link, although this second embodiment is equally applicable to the other types of the switching timing information, the other types of the access scheme, and the other types of the radio link quality.

In this second embodiment, the radio link switching scheme is carried out according to the sequence chart of FIG. 20 as follows.

First, the steps S1 to S13 similar to those of FIG. 4 for the first embodiment described above is carried out.

Then, after the new spread code confirmation is returned from the transceiver unit 15 to the control unit 17 at the step S13, the control unit 17 transmits the link quality measurement request signal to the transceiver unit 15 (step 141). In response the transceiver unit 15 measures the SIR of the radio link currently used for communication (step 143), and reports the link quality measurement response signal indicating the measured SIR value to the control unit 17 (step 145).

Next, the control unit 17 determines the switching timing notice frame number indicating the number of frames for providing the changed switching timing information, according to the SIR value reported from the transceiver unit 15 (step S147). Here, the switching timing notice frame number is determined according to a prescribed table of the SIR value and the switching timing notice frame number as shown in FIG. 21. For example, in a case the measured SIR value is 3.5 dB, the switching timing notice frame number is selected to be 3 according to this table of FIG. 21. In this table of FIG. 21, the switching timing notice frame number is set to be greater for the lower SIR value and lesser for the higher SIR value. The control unit 17 then notifies the determined switching timing notice frame number to the transceiver unit 15 by the switching timing notice frame number designation signal (step S149).

Figure 22:
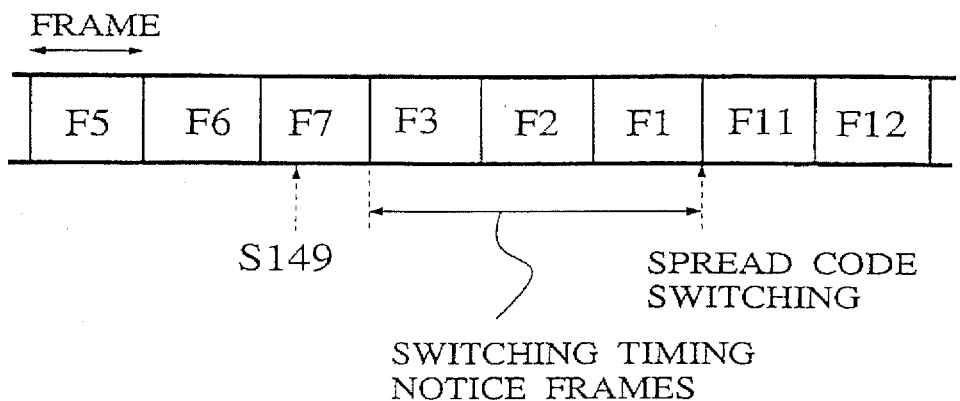
FIG. 22 is a diagram of a transmission signal in the scheme of FIG. 20 for explaining one possible relationship between the switching timing notice frames and the switching timing.

Thereafter the steps S15 to S25 similar to those of FIG. 4 for the first embodiment described above is carried out. In this case, the transceiver unit 15 sets up the switching timing in the switching timing set up unit 15a according to the designated switching timing notice frame number at the step S15A. For example, as shown in FIG. 22, in a case the designated switching timing notice frame number is 3, the switching timing is set to be as many frames as the designated switching timing notice frame number after the end of the frame which is transmitted while the step S149 is completed. Then, at the step S17, the frame number of the switching timing notice frames are changed to F3, F2, and F1 indicating the number of frames until the switching timing as in the fourth case of the first embodiment described above.

As described, in this second embodiment, when it is difficult to notify the radio link switching timing to the mobile station as the radio link quality such as the SIR value is degraded, the radio link switching timing notice frame number is increased, so that the probability for the failure of notifying the changed switching timing information to the mobile station can be reduced and therefore the probability for the failure of the radio link switching operation can be reduced. On the other hand, when the radio link quality such as the SIR value is not degraded, the radio link switching timing notice frame number is decreased, so that the loss of the appropriateness of the radio link switching timing due to the unnecessary extension of the switching timing can be prevented and therefore the potential for the trouble in the transmission order control by the frame number at the mobile station side can be eliminated.

It is to be noted that, instead of the SIR used above, the radio link quality may be indicated by any parameter from which the frame reception success probability of the radio link can be estimated such as the absolute receiving level, the bit error rate (BER), etc.

Also, instead of using the frame number of the fourth case of the first embodiment described above as the switching timing information, the unique word of the first case, the flag of the second case, or the flag in the housekeeping bit of the third case of the first embodiment described above may be used.

Moreover, instead of indicating the switching timing directly by the frame number as described above, the switching timing may be indicated indirectly by the frame number according to a prescribed relationship between the switching timing information and the period until the switching timing.

It is also to be noted that the content of the table of FIG. 21 used in determining the radio link switching timing notice frame number should be determined according to the required communication performance of the mobile communication system, without changing the basic principle of increasing the switching timing notice frame number for the lower radio link quality.

Figure 23:
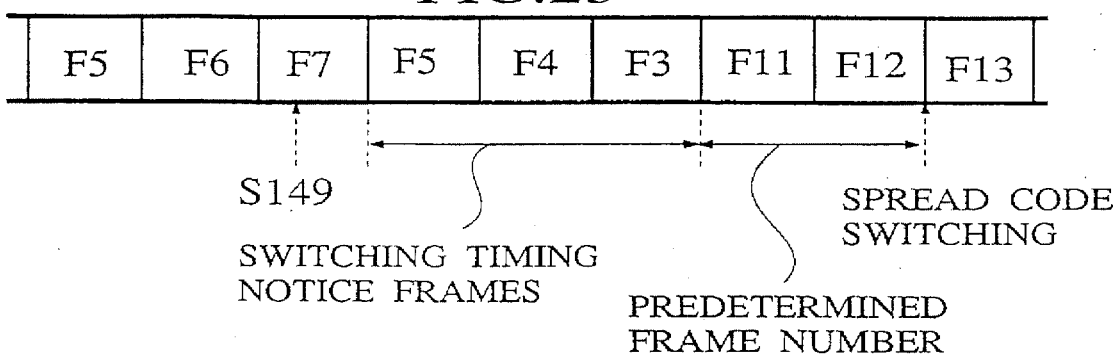
FIG. 23 is a diagram of a transmission signal in the scheme of FIG. 20 for explaining another possible relationship between the switching timing notice frames and the switching timing.

Furthermore, the relationship between the switching timing notice frame and the switching timing may be different from that shown in FIG. 22. For example, as shown in FIG. 23, the switching timing may be set to be as many frames as a predetermined frame number (two in FIG. 23) after the end of the last one of the changed switching timing information. This setting of FIG. 23 is useful when the mobile station requires more than one frame of time for the set up of the switching timing or the new radio link parameter.

Figure 24:
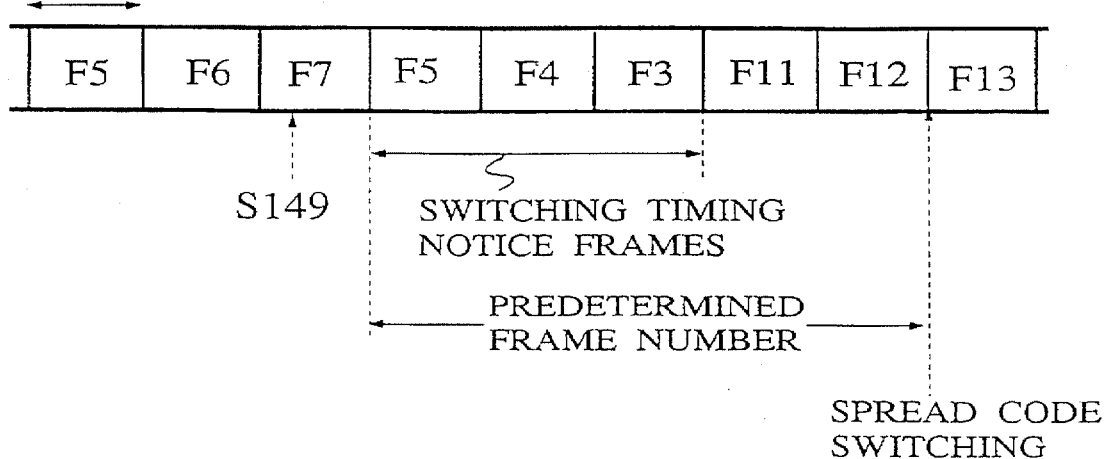
FIG. 24 is a diagram of a transmission signal in the scheme of FIG. 20 for explaining still another possible relationship between the switching timing notice frames and the switching timing.

In contrast, as shown in FIG. 24, the switching timing may be set to be as many frames as a predetermined frame number (five in FIG. 24) after the end of the first one of the changed switching timing information regardless of the switching timing notice frame number. In this case, the predetermined frame number should be greater than the maximum switching timing notice frame number that can be set up, for the obvious reason. This setting of FIG. 24 is suitable for a case in which the appropriateness of the radio link switching timing is not so important, but the prevention of the trouble in the transmission order control by the frame number is important, while it is difficult to control the switching timing at the mobile station according to the switching timing notice frame number determined at the base station.

Figure 20A:
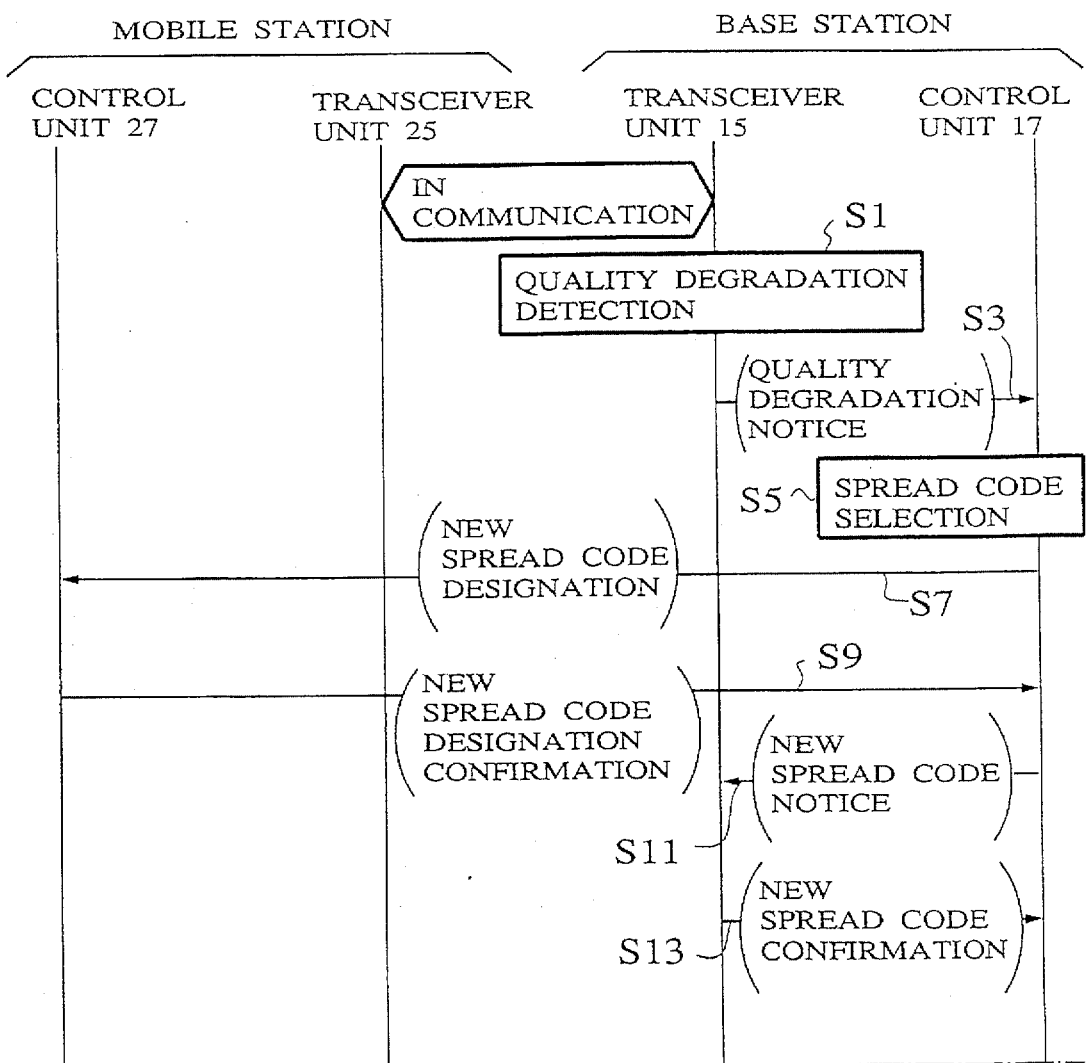
FIG. 20 is a sequence chart for the second embodiment of a radio link switching scheme according to the present invention.
Figure 20B:
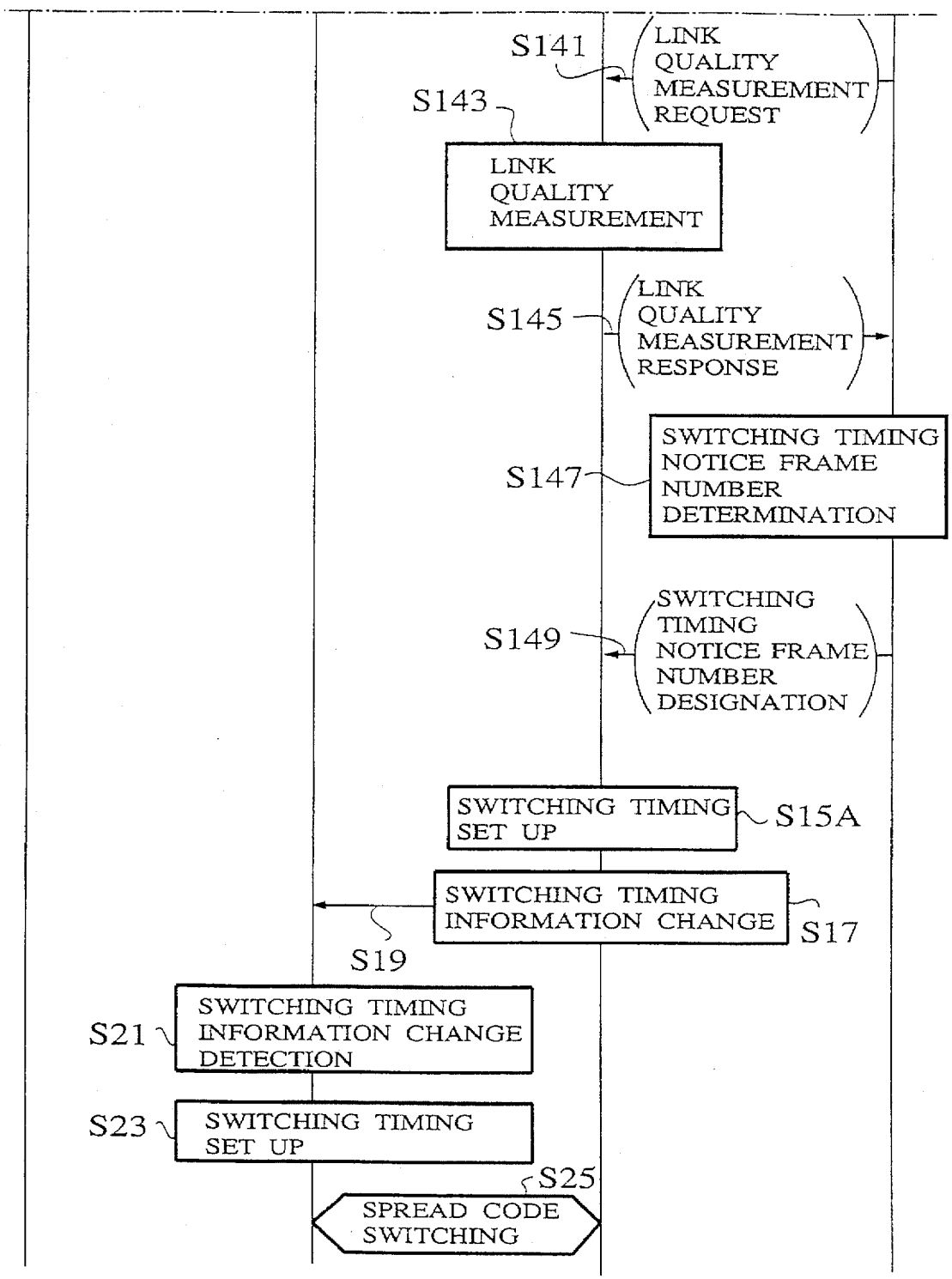

It is also possible to modify the procedure of FIG. 20 described above as shown in FIG. 25. Namely, in the procedure of FIG. 25, the radio link quality for determining the switching timing notice frame number is provided by the measured quality at a time of the radio link switching request. Thus, in this case, the transceiver unit 15 constantly measures the SIR value of the current radio link during the communication with the mobile station, and the degradation of the radio link quality is detected at the step S1A by detecting the lowering of the measured SIR value below a prescribed threshold. Then, the quality degradation notice signal including the latest measured SIR value is transmitted from the transceiver unit 15 to the control unit 17 at the step S3A.

Then, after the spread codes are selected at the step S5, the switching timing notice frame number is determined at the step S147 by using the table of FIG. 21 according to the latest SIR value contained in the quality degradation notice signal. The determined switching timing notice frame number is notified from the control unit 17 to the transceiver unit 15 as a part of the new spread code designation signal transmitted at the step S11A, and the transceiver unit 15 stores the designated switching timing notice frame number along with the designated spread codes for the reverse and forward links while returning the confirmation signal at the step S13A.

Then, at the step S15A, the transceiver unit 15 sets up the switching timing in the switching timing set up unit 15a according to the designated switching timing notice frame number Just as in a case of FIG. 20 described above, and the steps S17 to S25 similar to those of FIG. 4 for the first embodiment described above are carried out thereafter.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

We claim:

1. A method for switching a radio link in a mobile communication between a base station and a mobile station, comprising the steps of:

carrying out a communication between the base station and the mobile station through the radio link given in terms of frames while providing a switching timing information formed by a layer 1 bit data in each frame of the radio link;

changing the switching timing information in at least one of the frames of the radio link at the base station to indicate a switching of the radio link whenever a need for switching the radio link between the base station and the mobile station arises;

transmitting the changed switching timing information from the base station to the mobile station;

switching the radio link at the base station to a new radio link at a switching timing which is a first prescribed period of time after each frame in which the switching timing information is changed at the changing step;

detecting the changed switching timing information transmitted from the base station at the mobile station; and switching the radio link at the mobile station to the new radio link at a switching timing which is a second prescribed period of time after each frame in which the changed switching timing information is detected at the detecting step.

2. The method of claim 1, wherein the switching timing information is given by a unique word for maintaining a synchronization of the frames.

3. The method of claim 2, wherein the unique word is normally set to be one type and changed to another type different from said one type at the changing step.

4. The method of claim 2, wherein the unique word is normally set to be one type and the unique word in each of a plurality of consecutive frames are sequentially changed to other types different from said one type at the changing step.

5. The method of claim 1, further comprising the steps of:

changing the switching timing information in at least one of the frames of the radio link at the mobile station in response to a detection of the changed switching timing information at the detecting step; and transmitting the changed switching timing information from the mobile station to the base station;

wherein the base station carries out the switching of the radio link only when the changed switching timing information from the mobile station is received before the switching timing, and otherwise repeats the step of transmitting the changed switching timing information from the base station to the mobile station.

6. The method of claim 1, wherein the switching timing information is changed at the changing step such that a value of the changed switching timing information indicates a time until the switching timing.

7. The method of claim 6, wherein the switching timing information is changed at the changing step in a plurality of frames.

8. The method of claim 1, wherein the switching timing information is given by a flag provided in each frame.

9. The method of claim 8, wherein the flag is provided in a housekeeping bit of each frame for notifying a reception state of the radio link between the base station and the mobile station.

10. The method of claim 8, wherein the flag is normally set to take one value and changed to take another value different from said one value at the changing step.

11. The method of claim 8, wherein the flag takes any one of multiple values, and is changed at the changing step such that a value of the changed flag in each frame indicates a number of frames from said each frame to the switching timing.

12. The method of claim 11, wherein the flag is changed at the changing step in a plurality of consecutive frames with sequentially decreasing value of the flag.

13. The method of claim 1, wherein the switching timing information is given by a plurality of flags provided in each frame, which are changed at the changing step in a plurality of consecutive frames with sequentially decreasing number of the changed flags in the consecutive frames.

14. The method of claim 1, wherein the switching timing information is changed at the changing step in units of super frames formed by the frames.

15. The method of claim 1, wherein the switching timing information is given by a frame number assigned to each frame.

16. The method of claim 15, wherein the frame number is normally assigned sequentially in an order of transmission of the frames, and changed at the changing step to take a value which is not sequential with respect to the frame numbers of immediately preceding and following frames.

17. The method of claim 15, wherein the frame number is changed at the changing step such that a value of the changed frame number in each frame indicates a number of frames from said each frame to the switching timing.

18. The method of claim 17, wherein the frame number is changed at the changing step in a plurality of consecutive frames with sequentially decreasing value of the frame number.

19. The method of claim 1, wherein the base station and the mobile station maintain a synchronization state before and after the switching of the radio link to be identical.

20. The method of claim 1, wherein the switching timing information is changed at the changing step in a variable number of frames.

21. The method of claim 20, further comprising the steps of:
measuring a quality of the radio link; and
controlling the variable number of frames in which the switching timing information is to be changed at the changing step according to the quality measured at the measuring step.

22. The method of claim 21, wherein at the controlling step, the variable number is increased for a lower value of the quality measured at the measuring step, and decreased for a higher value of the quality measured at the measuring step.

23. The method of claim 21, wherein at the controlling step, the variable number is controlled by using a table specifying a desired number of frames in which the switching timing information is to be changed with respect to each level of the quality measured by the measuring step.

24. The method of claim 21, wherein the measuring step measures the quality at a timing at which the need for switching the radio link between the base station and the mobile station arises.

25. The method of claim 21, wherein the measuring step measures the quality at a timing before the switching timing information is changed at the base station.

26. The method of claim 1, wherein the switching timing is specified in advance as a prescribed number of frames from a start of each frame containing the changed switching timing information.

27. The method of claim 1, wherein the switching timing is specified in advance as a prescribed number of frames from an end of each frame containing the changed switching timing information.

28. A mobile communication system including a base station and a mobile station, comprising:
means for carrying out a communication between the base station and the mobile station through the radio link given in terms of frames while providing a switching timing information formed by a layer 1 bit data in each frame of the radio link;
means for changing the switching timing information in at least one of the frames of the radio link at the base station to indicate a switching of the radio link whenever a need for switching the radio link between the base station and the mobile station arises;
means for transmitting the changed switching timing information from the base station to the mobile station;
means for switching the radio link at the base station to a new radio link at a switching timing which is a first prescribed period of time after each frame in which the switching timing information is changed by the changing means;
means for detecting the changed switching timing information transmitted from the base station at the mobile station; and
means for switching the radio link at the mobile station to the new radio link at a switching timing which is a second prescribed period of time after each frame in which the changed switching timing information is detected by the detecting means.

29. The system of claim 28, wherein the switching timing information is given by a unique word for maintaining a synchronization of the frames.

30. The system of claim 29, wherein the unique word is normally set to be one type and the changing means changes the unique word to another type different from said one type.

31. The system of claim 29, wherein the unique word is normally set to be one type and the changing means changes the unique word in each of a plurality of consecutive frames sequentially to other types different from said one type.

32. The system of claim 28, further comprising:
means for changing the switching timing information in at least one of the frames of the radio link at the mobile station in response to a detection of the changed switching timing information by the detecting means; and
means for transmitting the changed switching timing information from the mobile station to the base station;
wherein at the base station, the switching of the radio link is carried out only when the changed switching timing information from the mobile station is received before the switching timing, and otherwise a transmission of the changed switching timing information from the base station to the mobile station is repeated.

33. The system of claim 28, wherein the changing means changes the switching timing information such that a value of the changed switching timing information indicates a time until the switching timing.

34. The system of claim 33, wherein the changing means changes the switching timing information in a plurality of frames.

35. The system of claim 28, wherein the switching timing information is given by a flag provided in each frame.

36. The system of claim 35, wherein the flag is provided in a housekeeping bit of each frame for notifying a reception state of the radio link between the base station and the mobile station.

37. The system of claim 35, wherein the flag is normally set to take one value and the changing means changes the flag to take another value different from said one value.

38. The system of claim 35, wherein the flag takes any one of multiple values, and the changing means changes the flag such that a value of the changed flag in each frame indicates a number of frames from said each frame to the switching timing.

39. The system of claim 38, wherein the changing means changes the flag in a plurality of consecutive frames with sequentially decreasing value of the flag.

40. The system of claim 28, wherein the switching timing information is given by a plurality of flags provided in each frame, and the changing means changes the flags in a plurality of consecutive frames with sequentially decreasing number of the changed flags in the consecutive frames.

41. The system of claim 28, wherein the changing means changes the switching timing information in units of super frames formed by the frames.

42. The system of claim 28, wherein the switching timing information is given by a frame number assigned to each frame.

43. The system of claim 42, wherein the frame number is normally assigned sequentially in an order of transmission of the frames, and the changing means changes the frame number to take a value which is not sequential with respect to the frame numbers of immediately preceding and following frames.

44. The system of claim 42, wherein the changing means changes the frame number such that a value of the changed frame number in each frame indicates a number of frames from said each frame to the switching timing.

45. The system of claim 44, wherein the changing means changes the frame number in a plurality of consecutive frames with sequentially decreasing value of the frame number.

46. The system of claim 28, wherein the base station and the mobile station maintain a synchronization state before and after the switching of the radio link to be identical.

47. The system of claim 28, wherein the changing means changes the switching timing information in a variable number of frames.

48. The system of claim 47, further comprising:
means for measuring a quality of the radio link; and
means for controlling the variable number of frames in which the switching timing information is to be changed by the changing means according to the quality measured by the measuring means.

49. The system of claim 48, wherein the controlling means increases the variable number for a lower value of the quality measured by the measuring means, and decreases the variable number for a higher value of the quality measured by the measuring means.

50. The system of claim 48, wherein the controlling means controls the variable number by using a table specifying a desired number of frames in which the switching timing information is to be changed with respect to each level of the quality measured by the measuring means.

51. The system of claim 48, wherein the measuring means measures the quality at a timing at which the need for switching the radio link between the base station and the mobile station arises.

52. The system of claim 48, wherein the measuring means measures the quality at a timing before the switching timing information is changed at the base station.

53. The system of claim 28, wherein the switching timing is specified in advance as a prescribed number of frames from a start of each frame containing the changed switching timing information.

54. The system of claim 28, wherein the switching timing is specified in advance as a prescribed number of frames from an end of each frame containing the changed switching timing information.

* * * * *